(12) United States Patent
Perlman et al.

(10) Patent No.: US 10,972,634 B2
(45) Date of Patent: Apr. 6, 2021

(54) COLOR CALIBRATION ALGORITHM

(71) Applicant: Twine Solutions Ltd., Petach Tikva (IL)

(72) Inventors: Mirta Perlman, Bet Elazari (IL); Gilad Gotesman, Netanya (IL); Ilanit Mor, Kiryat Ono (IL); Alon Moshe, Petah Tikva (IL)

(73) Assignee: Twine Solutions Ltd.

( * ) Notice: Subject to any disclaimer, the term of this patent is extended or adjusted under 35 U.S.C. 154(b) by 0 days.

(21) Appl. No.: 16/642,139

(22) PCT Filed: Aug. 27, 2018

(86) PCT No.: PCT/IL2018/050944
§ 371 (c)(1),
(2) Date: Feb. 26, 2020

(87) PCT Pub. No.: WO2019/043694
PCT Pub. Date: Mar. 7, 2019

(65) Prior Publication Data
US 2020/0358928 A1    Nov. 12, 2020

Related U.S. Application Data

(60) Provisional application No. 62/552,415, filed on Aug. 31, 2017.

(51) Int. Cl.
*H04N 1/60*     (2006.01)
*D06B 23/26*    (2006.01)

(52) U.S. Cl.
CPC .......... *H04N 1/6033* (2013.01); *D06B 23/26* (2013.01); *H04N 1/6058* (2013.01)

(58) Field of Classification Search
CPC .... D06B 23/00; D06B 23/28; D06B 2700/36; G01J 3/51; G06K 19/06028;
(Continued)

(56) References Cited

U.S. PATENT DOCUMENTS 8,632,266 B1    1/2014  Simmons
9,375,963 B2    6/2016  Humet Pous
(Continued)

OTHER PUBLICATIONS

International Search Report & Written Opinion dated Jan. 6, 2019, in international patent application No. PCT/IL2018/050944, 11 pages.

*Primary Examiner* — Negussie Worku
(74) *Attorney, Agent, or Firm* — Blueshift IP, LLC; Robert Plotkin

(57) ABSTRACT

A method for calibrating a dyeing machine, comprising: for each of multiple colors: performing a maximizing stage to determine an effective maximum ink dispensing rate corresponding to an effective maximum colorimetric value for the dyeing machine; performing a linearizing stage, comprising: determining multiple ink dispensing rates for performing the linearizing stage by dividing the effective maximum ink dispensing rate into multiple intervals, calculating from the effective maximum colorimetric value, a linear correspondence between the multiple ink dispensing rates and multiple calculated colorimetric values, dyeing a set of substrates according to the multiple ink dispensing rates, acquiring color values of the dyed set of substrates, interpolating a non-linear correspondence between the multiple ink dispensing rates and the acquired color values, and mapping the linear correspondence to the non-linear correspondence.

15 Claims, 14 Drawing Sheets

(58) Field of Classification Search
CPC ..... G06K 19/0614; G06K 2019/06225; G06K 7/10722; G06K 7/1408; G06K 7/1413; G06K 9/4652; G06T 2207/10024; G06T 2207/20021; G06T 2207/30204; G06T 7/62; G06T 7/90; H04N 9/00
USPC ........................................................ 358/504
See application file for complete search history.

(56) References Cited

U.S. PATENT DOCUMENTS

| | | | |
|---|---|---|---|
| 9,551,101 B2* | 1/2017 | Chang | D06B 3/28 |
| 2002/0104457 A1* | 8/2002 | Brydges | B41F 33/0045 |
| | | | 101/484 |
| 2007/0242877 A1 | 10/2007 | Peters | |
| 2014/0071504 A1 | 3/2014 | Kuno | |
| 2018/0124286 A1* | 5/2018 | Shaham | H04N 1/6022 |
| 2019/0032261 A1* | 1/2019 | Chang | D06B 23/14 |
| 2019/0066338 A1* | 2/2019 | Perlman | G06T 7/62 |
| 2020/0332446 A1* | 10/2020 | Moshe | D06B 3/045 |
| 2020/0332462 A1* | 10/2020 | Berns | D06B 11/0073 |

* cited by examiner

COLOR CALIBRATION ALGORITHM

CROSS-REFERENCE TO RELATED APPLICATIONS

This application claims the benefit of priority of U.S. Provisional Application No. 62/552,415, filed Aug. 31, 2017, and entitled "Color Calibration Algorithm", the contents of which are incorporated herein by reference in their entirety.

FIELD OF THE DISCLOSED TECHNIQUE

The disclosed technique relates to color calibration in general, and to color calibrating a dyeing machine, in particular.

BACKGROUND OF THE DISCLOSED TECHNIQUE

Dyeing machines have many mechanical components that are prone to misalignment due to drift, movement, and the like. These misalignments may cause aberrations, and lack of uniformity in the dyeing process, leading to color mismatches. The color in the dyeing process is affected by a number of parameters, among them: ink, dyed substrate parameters, such as ink absorption, whiteness and thickness; process parameters; process speed; ambient temperature; maximal ink dispensing rate; and drying parameters. These parameters and other may vary over time yielding variable dyeing results. For example, inconsistent ink dispensing rates may result in over or under dyeing, yielding a dyed shade that is either too light or too dark.

Thus, to ensure accurately matched dyeing results at a customer site, dyeing machines require regular tuning and calibration. Color calibration is the process of adjusting a dyeing process of a dyeing machine to a known color state, such as a pre-set color state that was measured at the factory. An effective calibration process can ensure consistent dyeing results from the dyeing machine, from run to run, from day to day and between different dyeing machines. Color calibration is the basis for consistent color matching.

SUMMARY OF THE PRESENT DISCLOSED TECHNIQUE

It is an object of the disclosed technique to provide a novel method and system for calibrating a dyeing machine.

In accordance with the disclosed technique, there is thus provided a method for calibrating a dyeing machine, comprising: for each of multiple ink channels: performing a maximizing stage to determine an effective maximum ink dispensing rate corresponding to an effective maximum colorimetric value for the dyeing machine; performing a linearizing stage, comprising: determining multiple ink dispensing rates for performing the linearizing stage by dividing the effective maximum ink dispensing rate into multiple intervals, calculating a linear correspondence between the multiple ink dispensing rates and multiple measured colorimetric values, dyeing a first set of substrates according to the multiple ink dispensing rates, acquiring color values of the dyed first set of substrates, building a non-linear correspondence between the multiple ink dispensing rates and the acquired color values, and mapping the linear correspondence to the non-linear correspondence.

In some embodiments, the maximizing stage and the linearizing stage are performed at each of a factory phase and an onsite phase, wherein results from the factory phase are used for performing the onsite phase.

In some embodiments, the maximizing stage further comprises: dyeing a second set of substrates according to multiple ink dispensing rates for performing the maximizing stage for the dyeing machine, acquiring color values of the second set of substrates with respect to a maximizing calibration card, and adjusting the multiple ink dispensing rates for performing the maximizing stage until a color value of the second set of dyed substrates matches the effective maximum colorimetric value for the dyeing machine.

In some embodiments, determining the effective maximum ink dispensing rate for the dyeing machine comprises interpolating multiple maximum ink dispensing rates and multiple maximum color values of multiple substrates dyed at the multiple maximum ink dispensing rates.

In some embodiments, dividing the effective maximum ink dispensing rate into multiple intervals comprises dividing according to a color response of multiple substrates dyed at the multiple ink dispensing rates determined for performing the linearizing stage.

In accordance with the disclosed technique, there is thus provided a system for calibrating a dyeing machine, comprising: a dyeing machine configured to dye multiple substrates according to multiple ink channels; and a processor configured to calibrate the dyeing machine for each of multiple ink channels by: performing a maximizing stage to determine an effective maximum ink dispensing rate corresponding to an effective maximum colorimetric value for the dyeing machine, performing a linearizing stage, comprising: determining multiple ink dispensing rates for performing the linearizing stage by dividing the effective maximum ink dispensing rate into multiple intervals, calculating a linear correspondence between the multiple ink dispensing rates and multiple calculated colorimetric values, obtaining color values of a first set of substrates dyed according to the multiple ink dispensing rates, building a non-linear correspondence between the multiple ink dispensing rates and the acquired color values, and mapping the linear correspondence to the non-linear correspondence.

In some embodiments, the system further comprises an optical detector configured to acquire said color values.

In some embodiments, the system further comprises a spectrophotometer configured to acquire said color values.

In some embodiments, the system further comprises a maximizing calibration card for performing the maximizing stage, wherein the maximizing calibration card is provided with an area for placing multiple substrates dyed at multiple maximum ink dispensing rates for each of the ink channels, and multiple areas comprising multiple grayscale features interleaved with multiple areas for placing substrates dyed at variable ink dispensing rates for each of the ink channels.

In some embodiments, the system further comprises a maximizing dispensing calibration card for performing the maximizing stage, wherein the maximizing dispensing calibration card is provided with an area for placing multiple substrates dyed at multiple maximal ink dispensing rates for each of the ink channels, and wherein the background of the maximizing calibration card presents multiple opposing grayscale gradients.

In some embodiments, the system further comprises a linearizing calibration card for performing the linearizing stage, wherein the linearizing calibration card is provided with an area for placing multiple substrates dyed at the multiple ink dispensing rates for performing the linearizing stage, and multiple areas comprising multiple grayscale features interleaved with multiple areas for placing substrates dyed at the multiple ink dispensing rates for performing the linearizing stage.

In some embodiments, the system further comprises a linearizing dispensing calibration card for performing the linearizing stage, wherein the linearizing dispensing calibration card is provided with an area for placing multiple substrates dyed at multiple ink dispensing rates for performing the linearizing stage for each of the ink channels, and wherein the background of the linearizing calibration card presents multiple opposing grayscale gradients.

In accordance with the disclosed technique, there is thus provided a computer program product comprising a non-transitory computer-readable storage medium having program code embodied thereon, the program code executable by at least one hardware processor to: for each of multiple inks: perform a maximizing stage to determine an effective maximum ink dispensing rate corresponding to the effective maximum colorimetric value for a dyeing machine, and perform a linearizing stage for the dyeing machine, comprising: determining multiple ink dispensing rates for performing the linearizing stage by dividing the effective maximum ink dispensing rate into multiple intervals, calculating from the effective maximum colorimetric value, a linear correspondence between the multiple ink dispensing rates and multiple calculated colorimetric values, obtaining color values of a first set of substrates dyed according to the multiple ink dispensing rates, interpolating a non-linear correspondence between the multiple ink dispensing rates and the acquired color values, and mapping the linear correspondence to the non-linear correspondence.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

Figure 1A:
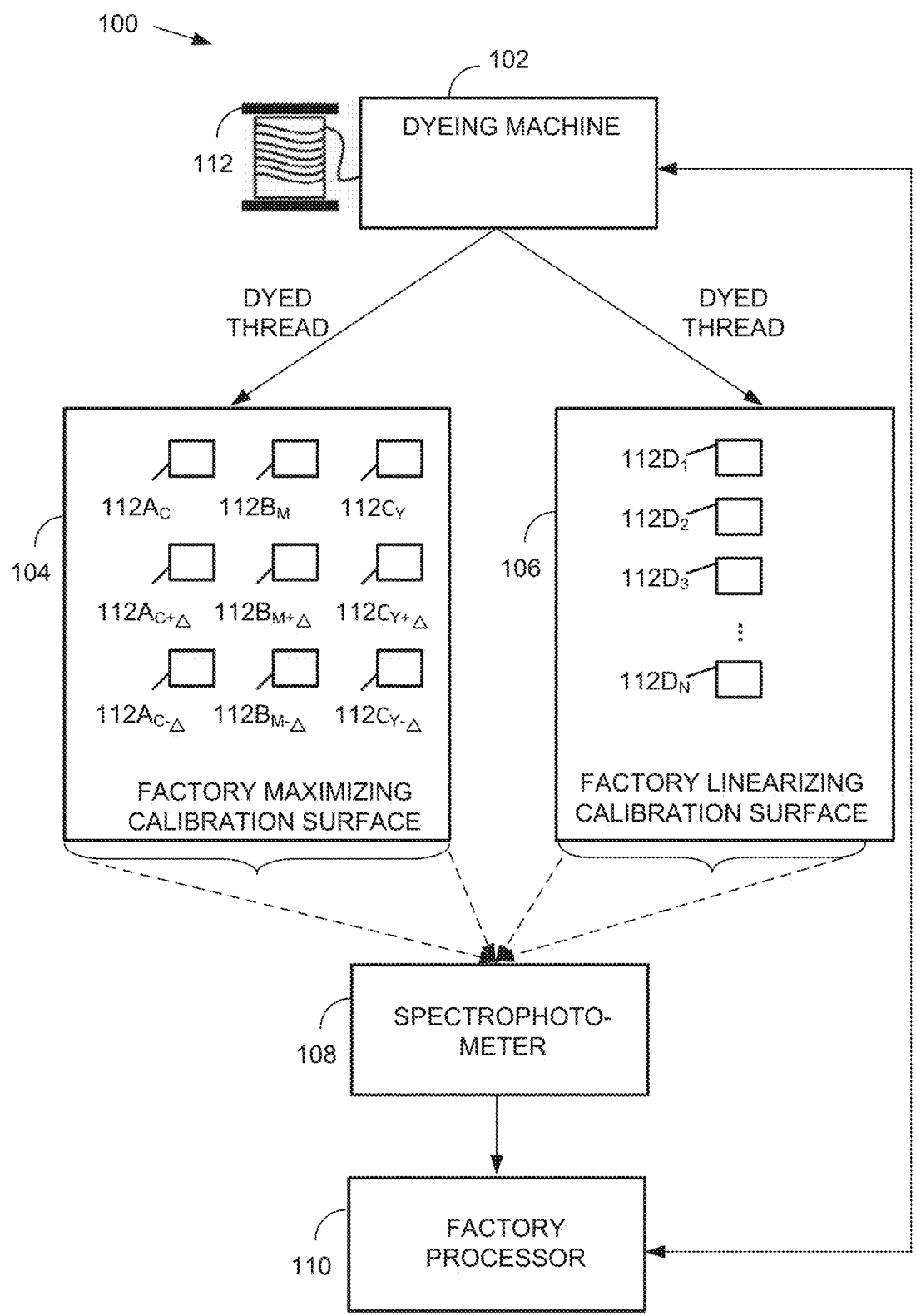
FIGS. 1A-1B, taken together, are a schematic illustration of a system for calibrating a dyeing machine in a two-phase calibration process, constructed and operative in accordance with an embodiment of the disclosed technique.

The disclosed technique overcomes the disadvantages of the prior art by providing a system and a method for calibrating a dyeing machine onsite. The calibration technique ensures that the colorimetric value of a substrate dyed onsite with respect to an ink dispensing rate corresponds to the colorimetric color values set in a factory prior to shipping the dyeing machine. The calibration technique includes a two-stage factory calibration phase, referred to herein as the "factory phase", followed by any number of two-stage onsite calibration phases, referred to herein as the "onsite phase", on an as needed basis.

Each of the factory phase and onsite phase include a maximizing stage and a linearizing stage, referred to herein as the factory maximizing stage and factory linearizing stage, and onsite maximizing stage and onsite linearizing stage, respectively. In each of the factory maximizing stage and onsite maximizing stage, a maximum ink dispensing rate is determined for the dyeing machine. One or more substrates are dyed at candidate maximal ink dispensing rates until a target maximum colorimetric value is achieved. In each of the factory linearizing stage and onsite linearizing stage, a range of ink dispensing rates for the dyeing machine and corresponding colorimetric values for substrates dyed accordingly are mapped in a manner to provide a linearizing correspondence. In any stage for each phase, the colorimetric values may be measured either using a spectrophotometer, or alternatively using a mobile device configured with a camera and a color detection application. Typically, a spectrophotometer is used in the factory phase for determining the colorimetric values, and the mobile device is used in the onsite phase for determining the colorimetric values.

Thus the factory maximizing stage determines a maximum effective ink dispensing rate for each ink color of the ink set of the dyeing machine. The maximum effective ink dispensing rate is matched to the corresponding maximum colorimetric value for a substrate dyed at the respective maximum effective ink dispensing rate. The ink dispensing rates of the dyeing machine corresponds to the resulting flow rate of the inks from the dyeing machine. The factory linearizing stage produces a linearizing function between multiple different ink dispensing rates, ranging from zero to the effective maximum rate determined above, and the corresponding colorimetric values of a substrate dyed at each of the multiple different ink dispensing rates. The colorimetric values determined in the factory calibration phase are measured using a spectrophotometer. The results of the factory calibration phase, i.e. the effective maximum ink dispensing rate and maximum colorimetric values for each ink color, and the respective linearizing functions are stored with the dyeing machine.

Prior to using the dyeing machine onsite, the dyeing machine is calibrated in a two-stage calibration using a similar technique as described above, using the results of the factory calibration phase as a reference. In the onsite maximizing stage, the onsite maximum effective ink dispensing rate is determined for the dyeing machine for each ink channel. This is accomplished by dyeing a substrate onsite, determining a colorimetric value of the dyed substrate, and adjusting the ink dispensing rate until the colorimetric value of the substrate dyed onsite matches the effective maximum colorimetric value stored with the dyeing machine.

Similarly, the onsite linearizing stage produces a linearization function between multiple different ink dispensing rates, ranging from zero to the onsite maximum effective ink dispensing rate, and corresponding colorimetric values for a substrate dyed at each of the multiple different ink dispensing rates. In one embodiment, the colorimetric values may be determined onsite using an application installed with a standard mobile device. Alternatively, the colorimetric values may be determined onsite using a spectrophotometer.

Figure 1B:
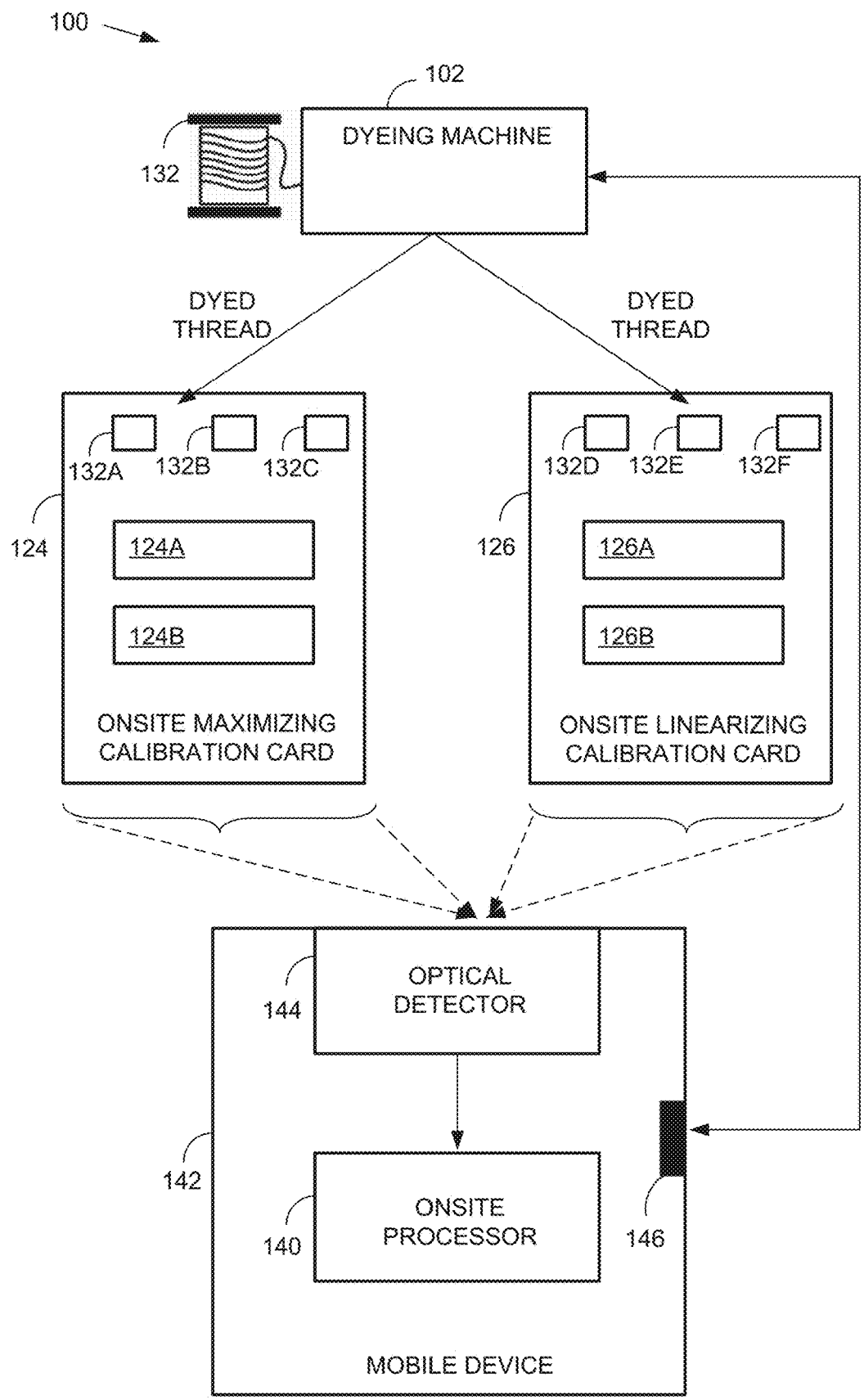

Reference is now made to FIGS. 1A-1B which, when taken together, are a schematic illustration of a system, generally referenced 100, for calibrating a dyeing machine in a two-stage calibration process for each of a factory calibration phase and a subsequent onsite calibration phase, constructed and operative in accordance with an embodiment of the disclosed technique. FIG. 1A illustrates components of system 100 for the factory calibration phase for the dyeing machine at a factory location, and FIG. 1B illustrates components of system 100 for the onsite calibration phase for the dyeing machine at an onsite location, such as at a customer location. Typically, the calibration of the dyeing machine at the factory location takes place prior to the calibration of the dyeing machine at the onsite location. The onsite calibration of the dyeing machine may be performed any number of times, such as before each printing batch by the dyeing machine.

With reference to FIG. 1A, system 100 includes dyeing machine 102, a factory maximizing calibration card 104, a factory linearizing calibration card 106, a spectrophotometer 108, at least one factory processor 110, and a dyeable substrate 112, such as thread. Although the term 'thread' is used herein to refer to dyeable substrate 112, this is not meant to be limiting, and it is to be understood that any dyeable substrate may be similarly used. Dyeing machine 102 is configured to dye multiple portions of thread 112 multiple colors, such as cyan, magenta, yellow, and black at varying ink dispensing rates. The rates at which the dyes are dispensed by dyeing machine 102 are controllable via a user interface, such as a mechanical or electronic control (not shown). In one embodiment, the rates at which the dyes are dispensed by dyeing machine 102 are controllable via factory processor 110, and which may be communicatively coupled with dyeing machine 102.

Factory maximizing calibration card 104 and factory linearizing calibration card 106 are each configured to display segments of thread 112 that have been dyed by dyeing machine 102. The segments of thread 112 may be wound onto factory maximizing calibration card 104 and factory linearizing calibration card 106 using a timing belt drive (TBD) technique. Alternatively the segments of thread 112 may be embroidered onto factory maximizing calibration card 104 and factory linearizing calibration card 106, or otherwise displayed on a surface.

Spectrophotometer 108 is optically coupled with factory maximizing calibration card 104 and factory linearizing calibration card 106. Factory processor 110 is communicatively coupled with spectrophotometer 108, and with dyeing machine 102. In one embodiment, factory processor 110 is integrated with spectrophotometer 108. In another embodiment, factory processor 110 is integrated with dyeing machine 102.

The factory calibration phase includes two stages: a factory maximum ink dispensing rate (DR) stage for determining the maximum effective ink dispensing rate for dyeing machine 102, and a factory linearization stage for determining a linearizing relationship for dyeing machine 102 between a range of ink dispensing rates and colorimetric values of a substrate dyed accordingly. A description of the factory maximum ink dispensing rate stage now follows:

Dyeing machine 102 may include three color channels corresponding to the standard ink set colors of cyan, magenta, and yellow, and optionally a fourth black (key) color channel. However, it is to be understood that dyeing machine 102 is not limited to the standard ink set color, and may include fewer or more color channels, corresponding to alternative ink sets. For each color channel of dyeing machine 102, multiple segments of thread 112 are dyed via dyeing machine 102 according to multiple candidate ink dispensing rates (DRs), such as the three ink dispensing rates $DR_0$, $DR_{-1}$, $DR_{+1}$ where $DR_0$ corresponds to a Nominal ink dispensing rate yielding a colorimetric value that is equivalent to 100% ink dispensing, $DR_{-1}$ corresponds to a Nominal-$\Delta$ ink dispensing rate yielding a colorimetric value that is equivalent to 100%-$\Delta$ ink dispensing; and $DR_{+1}$ corresponds to a Nominal+$\Delta$ ink dispensing rate yielding a colorimetric value that is equivalent to 100%+$\Delta$ ink dispensing. The colorimetric value may be evaluated with respect to any suitable device independent colorimetric space, such as CIELab, CIE XYZ, CIE LUV, CIE UVW, and the like. Optionally, if the behavior of the dyeing process is highly nonlinear, dyeing machine 102 may dye thread 112 at five different ink dispensing rates, such as corresponding to CIELab colorimetric values equivalent to 100%, 100%±$\Delta$, and 100%±2$\Delta$.

Figure 2A:
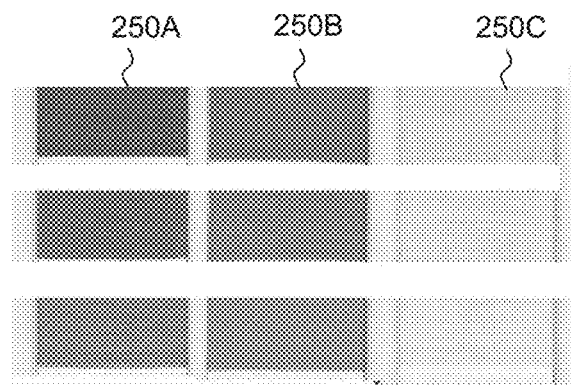
FIG. 2A illustrates exemplary results for dyeing a thread according to the three different maximal ink dispensing rates, operative in accordance with an embodiment of the disclosed technique.

Reference is now made FIG. 2A which illustrates exemplary results for dyeing a thread 112, according to the three different maximal ink dispensing rates, operative in accordance with an embodiment of the disclosed technique. Column 250A indicates three different maximal ink dispensing rates for cyan: 100%, 100%±$\Delta_{cyan}$; column 250B indicates three different maximal ink dispensing rates for magenta: 100%, 100%±$\Delta_{magenta}$; and column 250C indicates three different maximal ink dispensing rates for yellow: 100%, 100%±$\Delta_{yellow}$. The dyed threads are wound, or embroidered to maintain a relatively flat shape, to avoid illumination distortions, such as shadowing.

Referring back to FIG. 1A while still referring to FIG. 2A, for each color channel, the samples of thread 112 dyed at the three different ink dispensing rates (i.e. Nominal, Nominal+Δ, Nominal−Δ) are disposed on factory maximizing calibration card 104. The samples are generally indicated in FIG. 1A as features $112A_C$, $112A_C+\Delta$, and $112A_C-\Delta$ representing the three cyan dyed samples corresponding to column 250A of FIG. 2A; as features $112B_M$, $112B_M+\Delta$, and $112B_M-\Delta$ representing the three magenta dyed samples corresponding to column 250B of FIG. 2A, and features $112C_Y$, $112C_Y+\Delta$, and $112C_Y-\Delta$, representing the three yellow dyed samples corresponding to column 250C of FIG. 2A. For each of the color channels, spectrophotometer 108 measures the colorimetric CIELab value for each of the multiple dyed samples $112A_C$, $112A_C+\Delta$, and $112A_C-\Delta$; $112B_M$, $112B_M+\Delta$, and $112B_M-\Delta$; and $112C_Y$, $112C_Y+\Delta$, and $112C-\Delta$. Thus, in this example there are nine dyed samples, three for each color channel (100%+Δ, 100%, 100%−Δ). Optionally, each measurement per dyed sample may be performed multiple times and at different orientation angles, and the respective colorimetric values for each of the nine dyed samples may be determined by averaging over the multiple measurements respective of the orientation angles. Next, factory processor 110 determines the effective maximum colorimetric value and corresponding ink dispensing rate, herein referred to as the factory effective maximum ink dispensing rate for each color channel by interpolating (function $f$) or otherwise approximating between the three values (100%+Δ, 100%, 100%−Δ):

$$DR_{eff\text{-}factory}^{Cyan}=f_{Cyan}(CV_-,CV_0,CV_+)$$

$$DR_{eff\text{-}factory}^{Magenta}=f_{Magenta}(CV_-,CV_0,CV_+)$$

$$DR_{eff\text{-}factory}^{Yellow}=f_{Yellow}(CV_-,CV_0,CV_+)$$

where CV is the colorimetric value, i.e. the CIELab colorimetric value.

A second iteration may be performed if the factory effective maximum ink dispensing rate exceeds the preset tolerance and its position is at one of the function limits.

Factory processor 110 determines multiple ink dispensing rates for performing the factory linearizing stage, referred to herein as linearizing ink dispensing rates, based on the previously determined factory effective maximum ink dispensing rate. For example, for each color channel, factory processor 110 may divide the ranges of the ink dispensing rates between 0 and the factory effective maximum ink dispensing rate into N equally spaced intervals, where N may vary depending on the color channel. Alternatively, factory processor 110 may divide the ranges of the ink dispensing rates between 0 and the factory effective maximum ink dispensing rate for each color channel into N intervals, the size of which depend on the colorimetric response of the thread to the ink dispensing rate.

Factory processor 110 calculates a factory linearizing ink dispensing rate versus color correspondence. This correspondence is a linear relationship between the multiple ink dispensing rates calculated for performing the factory linearizing stage and the corresponding colorimetric CIELab values $f_{linFAC}(DR)$ of threads dyed according to these ink dispensing rates.

For each color channel, dyeing machine 102 dyes portions of thread 112 according to the multiple factory linearizing ink dispensing rates determined above. For example, with reference to FIG. 2C, row 262D indicates multiple threads dyed cyan at ink dispensing rates ranging from zero to a maximum, or near maximum (95%) effective ink dispensing rate for cyan; row 262E indicates multiple threads dyed magenta at ink dispensing rates ranging from zero to a maximum or near maximum (95%) effective ink dispensing rate for magenta; and row 262F indicates multiple threads dyed yellow at ink dispensing rates ranging from zero to a maximum or near maximum (95%) effective ink dispensing rate for yellow.

Referring back to FIG. 1A, for each color channel, the dyed threads are wound or embroidered accordingly, and disposed on factory linearization calibration card 106, indicated as features $112D_1$, $112D_2$, $112D_3$ ... $112D_N$. The dyed threads may be ordered according to the concentration of the ink dispensing rates, i.e. from 0% ink dispensing rate to 100% ink dispensing rate.

Spectrophotometer 108 measures the colorimetric value of threads $112D_1$, $112D_2$, $112D_3$ ... $112D_N$, dyed according to the ink dispensing rates calibrated for performing the factory linearizing stage. In one embodiment, each color channel is acquired by spectrophotometer 108 separately. For each color channel, spectrophotometer 108 measures the colorimetric CIELab values of the N dyed threads, accordingly, to get $(DR_i, CIELab_i)$, i=1, ..., n. Optionally, the measurements per dyed sample may be performed multiple times and at different orientation angles, and the respective colorimetric values for each of the dyed samples may be determined by averaging over the multiple measurements respective of the orientation angles. Factory processor 110 builds an interpolating curve based on the measurements obtained from spectrophotometer 108, resulting in a factory non-linear ink dispensing rate versus color correspondence, $Lab=f_{CURVE\text{-}FAC}(DR)$. Factory processor 110 maps the factory linear ink dispensing rate versus color correspondence, $f_{LIN\text{-}FAC}(DR)$, to the factory non-linear ink dispensing rate versus color correspondence, using the inverse of the factory linear ink dispensing rate versus color correspondence calculated above: i.e. $DR_{LIN\text{-}FAC}=f^{-1}(Lab_{LIN})$. Factory processor 110 uses the linearizing function $DR \rightarrow DR_{LIN\text{-}FAC}$ to determine a linearizing ink dispensing rate DR for a desired colorimetric value.

Figure 3:
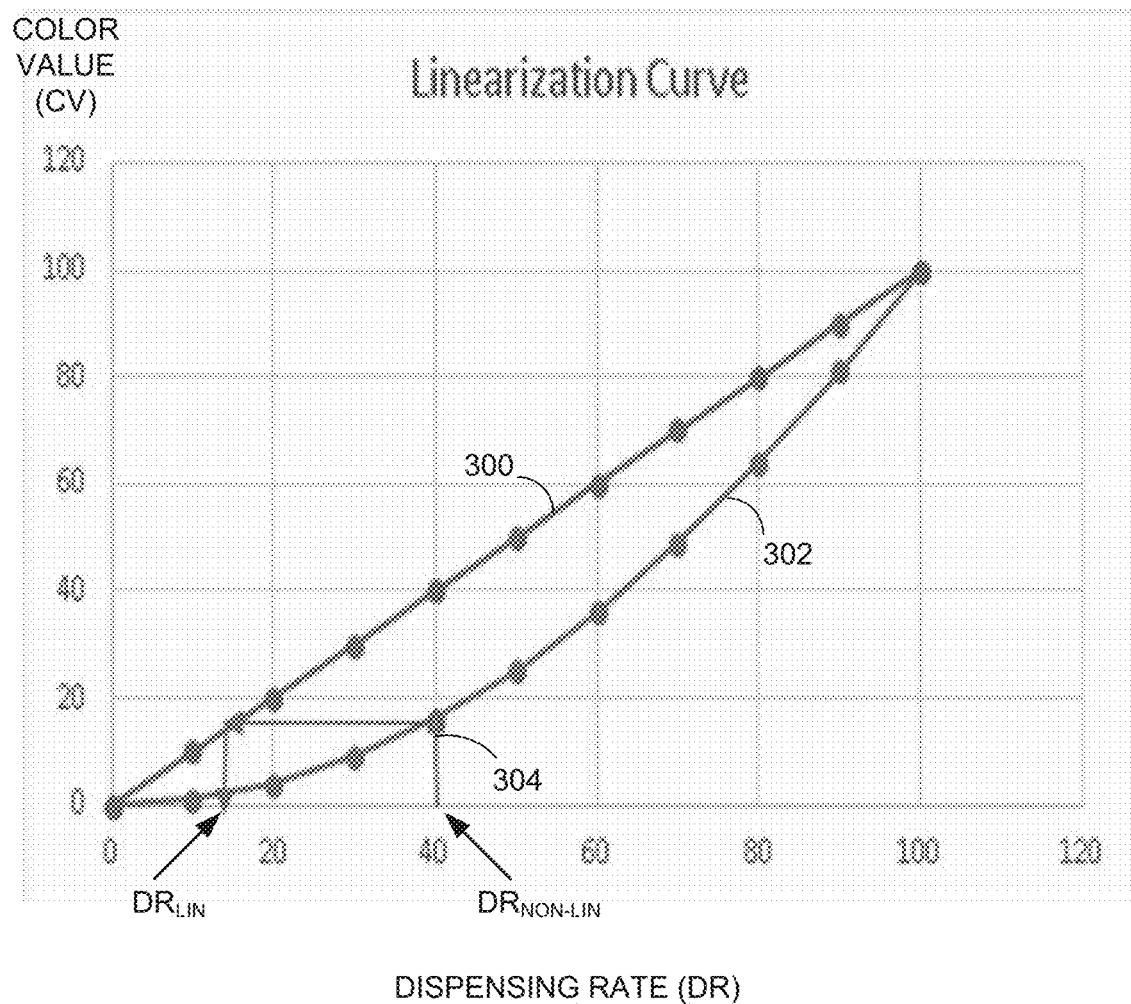
FIG. 3 illustrates a conceptual illustration for an exemplary linear dispensing versus color correspondence mapped to a non-linear dispensing versus color correspondence for the purpose of calibrating a dyeing machine operative in accordance with an embodiment of the disclosed technique.

Reference is now made to FIG. 3, which illustrates a conceptual illustration of an exemplary linear ink dispensing versus color correspondence mapped to a non-linear ink dispensing versus color correspondence for the purpose of calibrating dyeing machine 102, operative in accordance with an embodiment of the disclosed technique. FIG. 3 depicts color value, or CV (y-axis) which may refer to colorimetric values with respect to ink dispensing rates, or DR (x-axis). For example, when using the CIELab color space, the colorimetric value may relate to the L*, a* or b* value. Curve 300 is a linear relationship that depicts the linear ink dispensing rate versus color value correspondence. For example, curve 300 represents the factory linear ink dispensing rate versus color correspondence, $f_{LIN\text{-}FAC}$ (DR). Let f be the linear response relationship between linear ink percentage and CV, $$CV=f(DR_{Lin})$$

Curve 302 depicts the non-linear ink dispensing rate versus color value correspondence, such as the curve interpolated above. In FIG. 3, curve 302 is convex, however this is not meant to be limiting, and curve 302 can indicate other non-linear relationships. Let g be the non-linear relationship between the ink percentage and CV, the calibration parameter, $$CV=g(DR_{NL}),$$

then the relationship, or linearizing mapping 304 between the linear DR color correspondence and the nonlinear DR color correspondence is given by the following linearizing function:

$$DR_{lin}=f(g(DR_{NL})),$$

Figure 2B:
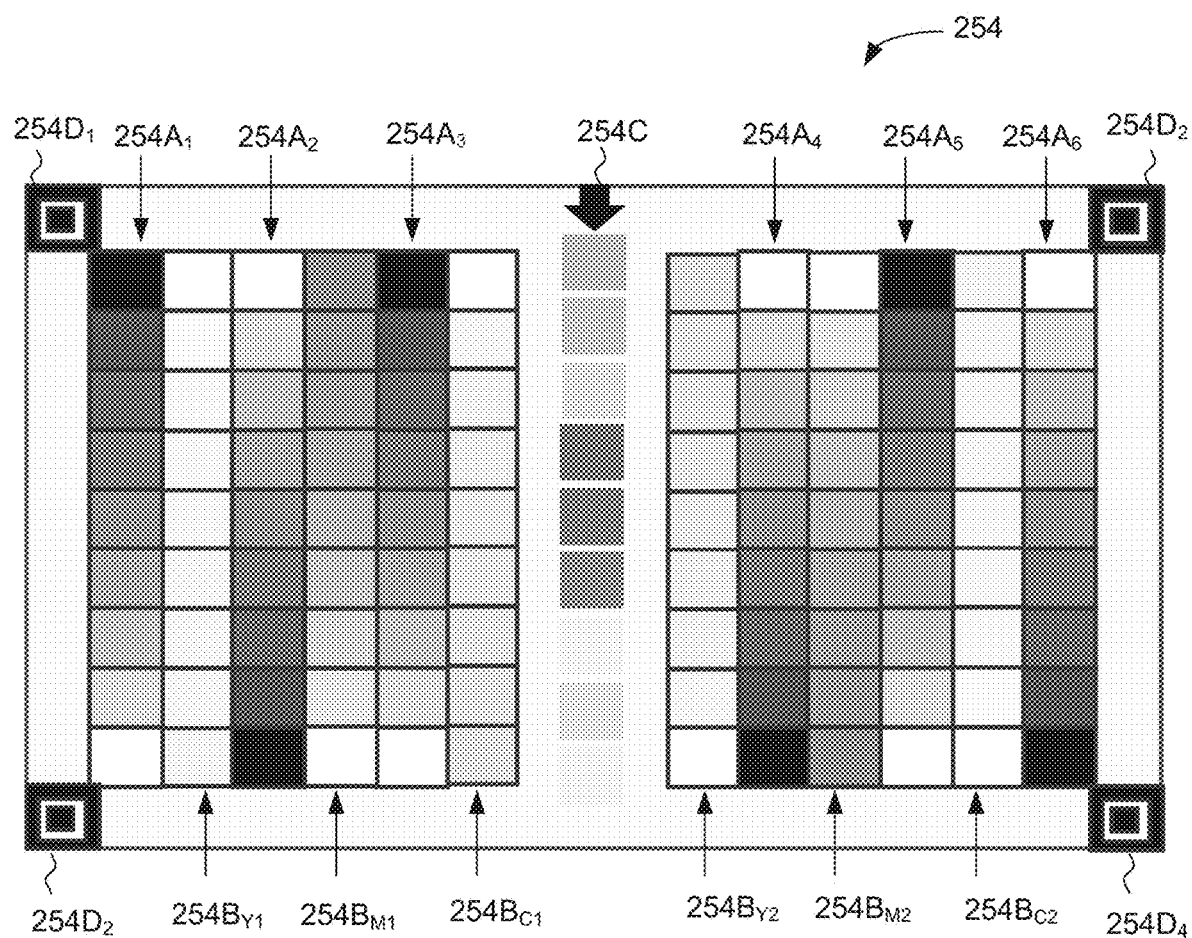
FIG. 2B is a schematic illustration of an exemplary maximizing calibration card, constructed and operative in accordance with an embodiment of the disclosed technique.
Figure 2C:
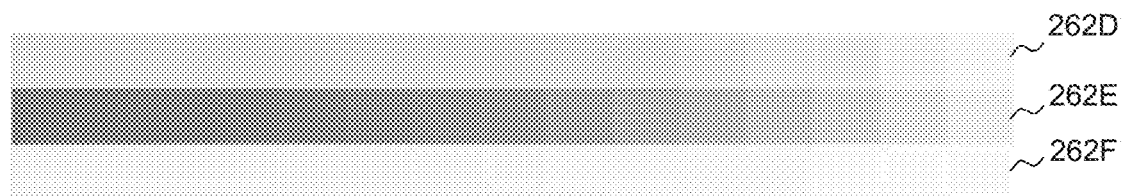
FIG. 2C illustrates exemplary results for dyeing a thread according to the multiple linearizing ink dispensing rates, operative in accordance with an embodiment of the disclosed technique.
Figure 2D:
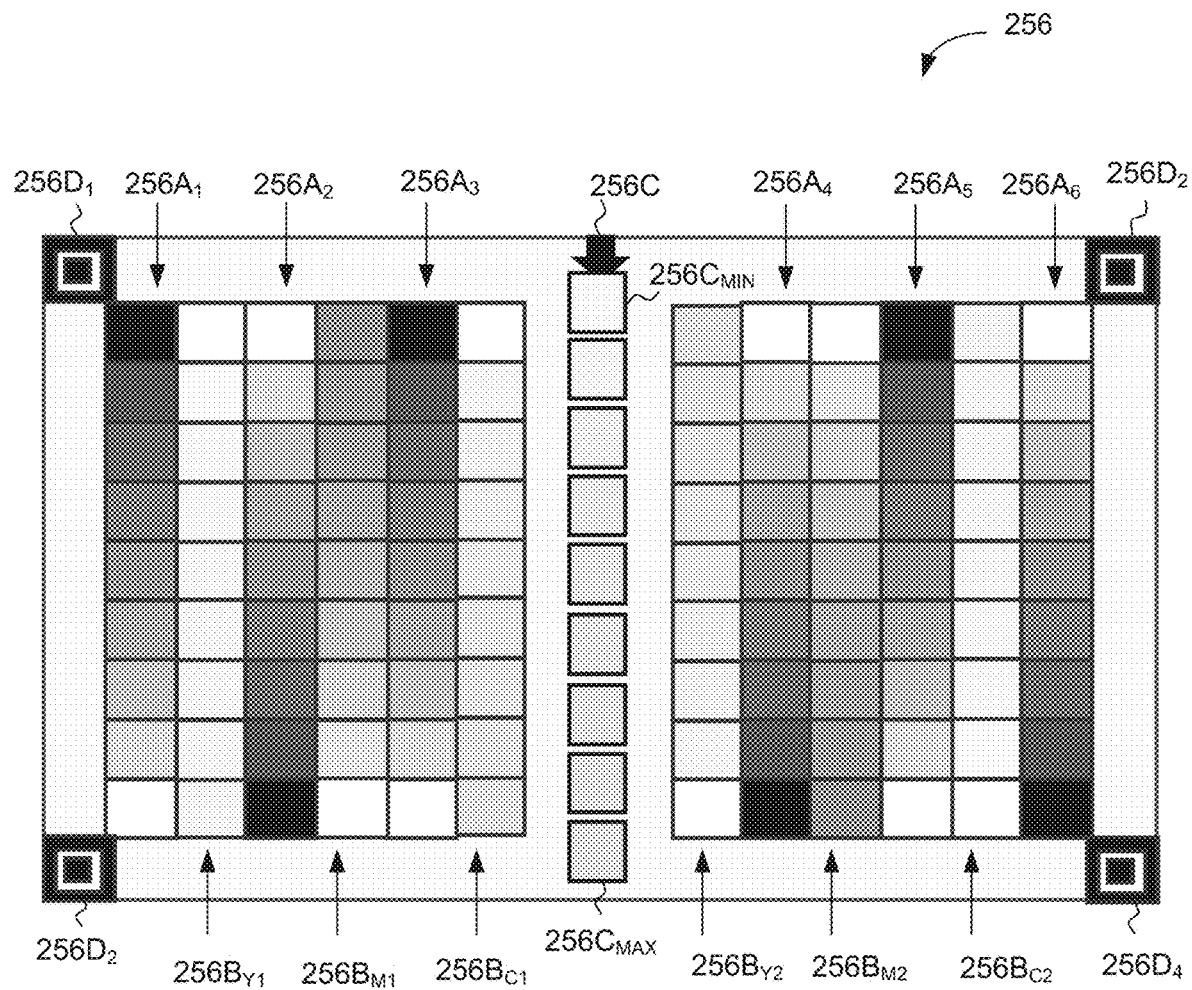
FIG. 2D is a schematic illustration of an exemplary linearizing calibration card, constructed and operative in accordance with an embodiment of the disclosed technique.
Figure 2E:
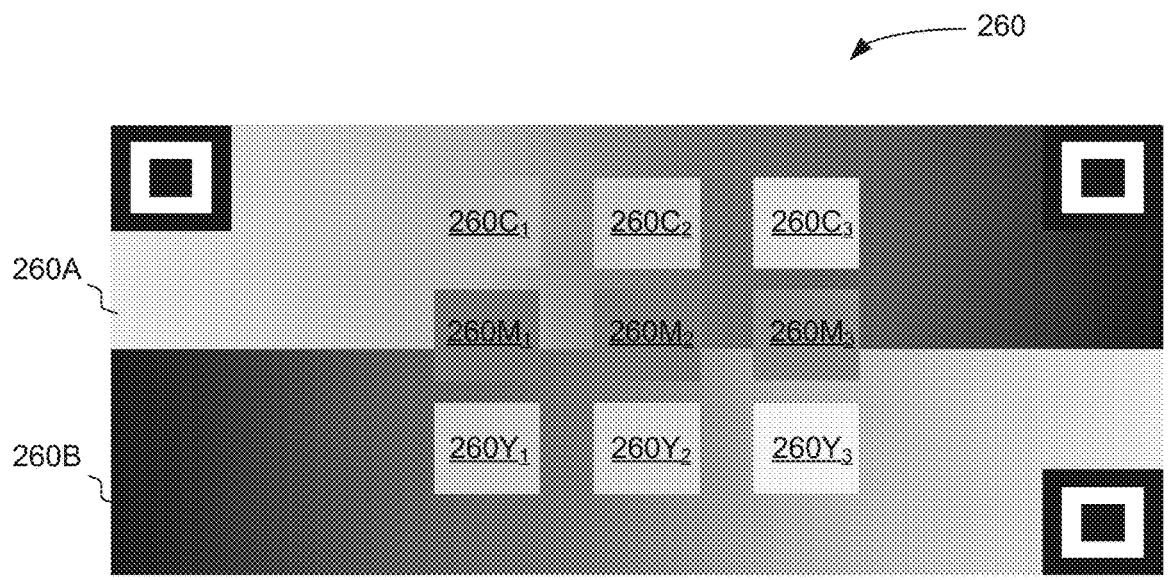
FIG. 2E is a schematic illustration of an exemplary maximizing dispensing calibration card, constructed and operative in accordance with another embodiment of the disclosed technique.
Figure 2F:
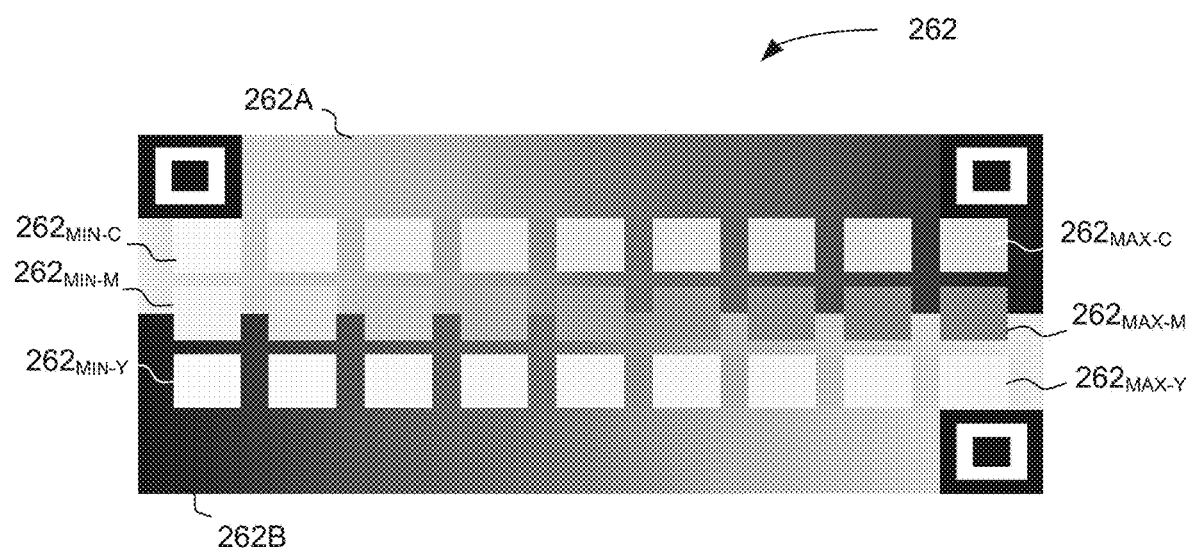
FIG. 2F is a schematic illustration of an exemplary linearizing dispensing calibration card, constructed and operative in accordance with another embodiment of the disclosed technique.

The onsite calibration phase includes an onsite maximizing stage for determining the maximum effective ink dispensing rate for dyeing machine 102, and an onsite linearization stage for determining a linearizing relationship for dyeing machine 102 between a range of ink dispensing rates and resulting colorimetric values of a substrate dyed accordingly. A description of the onsite maximizing stage now follows:

Reference is now made to FIG. 1B which illustrates components for system 100, for implementing an onsite calibration phase, following the factory calibration phase describe above. This arrangement for system 100 is used to calibrate dyeing machine 102 at a customer site following the factory calibration. System 100 of FIG. 1B additionally includes an onsite maximizing calibration card 124, an onsite linearizing calibration card 126, and a dyeable thread 132. Onsite maximizing calibration card 124 has printed thereon at least multiple contrasting and varying grayscale features 124A, and multiple contrasting and varying color-scale features 124B. Onsite linearizing calibration card 126 has printed thereon at least multiple contrasting and varying grayscale features 126A, and multiple contrasting and varying color-scale features 126B. Onsite maximizing calibration card 124 and onsite linearizing calibration card 126 are each configured to display portions of thread 132 that have been dyed by dyeing machine 102. The portions of thread 132 may be wound onto onsite maximizing calibration card 124 and onsite linearizing calibration card 126 using a timing belt drive (TBD) technique. Alternatively the portions of thread 132 may be embroidered and placed onto onsite maximizing calibration card 124 and onsite linearizing calibration card 126. For example, in one embodiment, card 254 of FIG. 2B is representative of onsite maximizing calibration card 124 and card 256 of FIG. 2D is representative of onsite linearizing calibration card 126. In another embodiment, card 260 of FIG. 2E is representative of onsite maximizing calibration card 124, and card 262 of FIG. 2F is representative of onsite linearizing calibration card 126. System 100 further includes an optical detector 144, an onsite processor 140, and a transceiver 146 integrated with a mobile device 142.

Figure 1C:
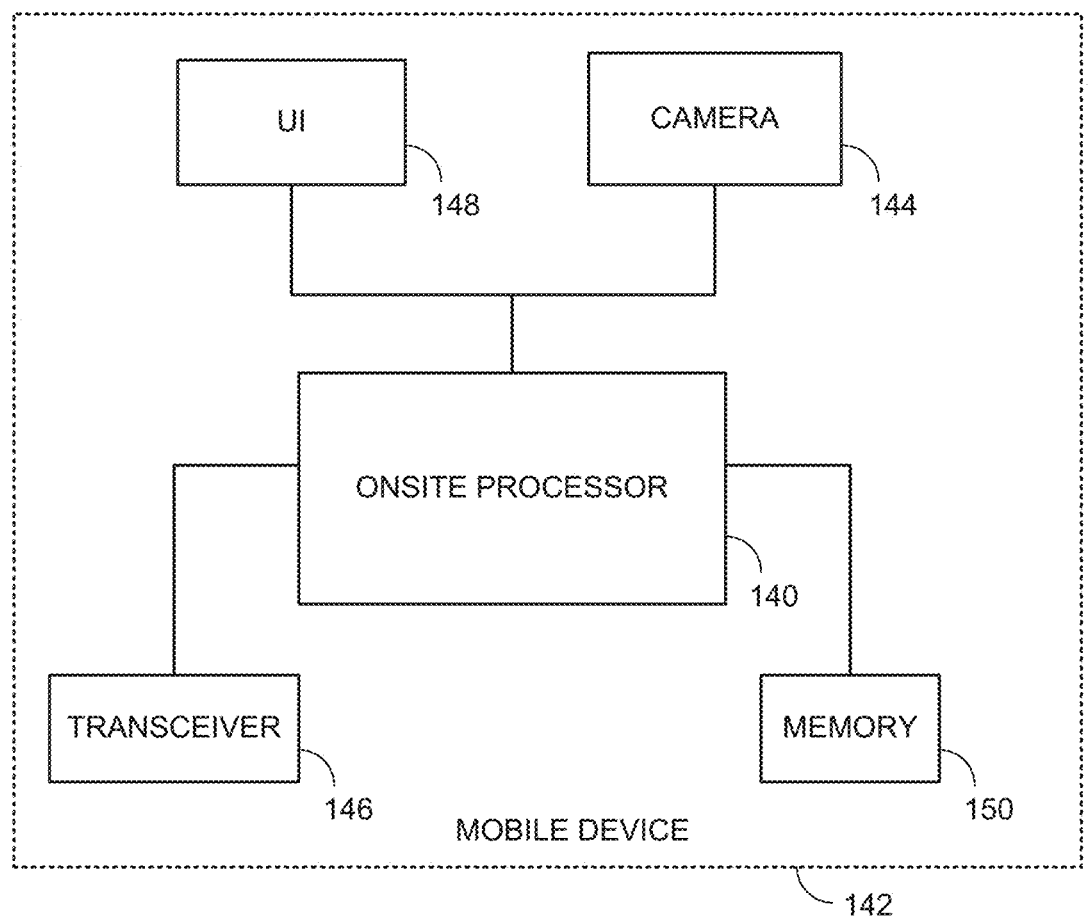
FIG. 1C is a schematic illustration of a mobile device, such as the mobile device of FIG. 1B, constructed and operative in accordance with an embodiment of the disclosed technique.

Reference is now made to FIG. 1C which illustrates an exemplary implementation of mobile device 142 of FIG. 1B, in accordance with an embodiment of the disclosed technique. Mobile device 142 includes at least onsite processor 140, optical detector (camera) 144, a user interface (UI) 148, a memory 150, and transceiver 146. Camera 144, UI 148, memory 150, and transceiver 146 are each electromagnetically coupled to onsite processor 140.

Onsite processor 140 may include any combination of a central processing unit (CPU), graphical processing unit (GPU), digital signal processor (DSP), accelerator processing unit (APU) and the like. Onsite processor 140 is operative to store one or more program code instructions and data, such as raw images and processed images in memory 150. Transceiver 146 may include one or more of: a respective medium range RF transceiver (e.g., WIFI), a respective short range transceiver (e.g., Bluetooth), and a respective cellular communication transceiver (e.g., GSM, LTE, WIMAX). Transceiver 146 is operative to send and receive radio frequency (RF) signals relating to data and executable instructions. For example, transceiver 146 is operative to communicate with dyeing machine 102 of FIG. 1B. UI 148 is a touch-based graphical user interface (GUI) operative to display images acquired via camera 144, and received touch-based input from a user.

Optical detector 144 of mobile device 142 is optically coupled with onsite maximizing calibration card 124 and onsite linearizing calibration card 126. Optionally, onsite processor 140 of mobile device 142 is communicatively coupled with dyeing machine 102, such as via transceiver 146.

Referring back to FIG. 1B, for each color channel, i.e. cyan, magenta and yellow of dyeing machine 102, multiple threads 132 are dyed via dyeing machine 102 according to multiple candidate ink dispensing rates corresponding to the effective maximum colorimetric value. For example, dyeing machine 102 dyes samples of thread 132 according to three candidate ink dispensing rates $DR_{Site0}$, $DR_{Site-1}$, $DR_{Site+1}$ for performing the onsite maximizing stage, where $DR_{Site0}$ should correspond to a Nominal ink dispensing rate yielding a CIELab colorimetric value that is equivalent to 100% ink dispensing, $DR_{Site+1}$ corresponds to a Nominal+Δ ink dispensing rate yielding a CIELab colorimetric value that is equivalent to 100%+Δ ink dispensing; and $DR_{Site-1}$ corresponds to a Nominal−Δ ink dispensing rate yielding a CIELab colorimetric value that is equivalent to 100%−Δ ink dispensing. Optionally, if the behavior of the dyeing process is highly nonlinear, dyeing machine 102 may dye thread 132 at five different candidate ink dispensing rates, such as corresponding to CIELab colorimetric values equivalent to 100%, 100%±Δ, and 100%±2Δ.

Reference is now made FIG. 2A which illustrates exemplary results for dyeing thread 132 according to the three different candidate maximal ink dispensing rates. Column 250A indicates three different maximal ink dispensing rates for cyan: 100%, 100%±$\Delta_{cyan}$; column 250B indicates three different maximal ink dispensing rates for magenta: 100%, 100%±$\Delta_{magenta}$; and column 250C indicates three different maximal ink dispensing rates for yellow: 100%, 100%±$\Delta_{yellow}$. The dyed threads 250A, 250B, and 250C are wound or embroidered onto a surface to maintain a relatively flat shape, to avoid illumination distortions, such as shadowing.

Referring back to FIG. 1B while still referring to FIG. 2A, the samples of thread 132 dyed at the three different candidate maximal ink dispensing rates (i.e. Nominal, Nominal+Δ, Nominal−Δ corresponding to respective columns 250A, 250B, and 250C) are placed on onsite maximizing calibration card 124. For the purpose of clarity, the samples are generally indicated in FIG. 1B as feature 132A, representing the three cyan dyed samples corresponding to column 250A of FIG. 2A; feature 132B, representing the three magenta dyed samples corresponding to column 250B of FIGS. 2A, and 132C, representing the three yellow dyed samples corresponding to column 250C of FIG. 2A. For each of the color channels, onsite processor 140 obtains the colorimetric CIELab value for each of the multiple dyed samples included in features 132A, 132B, and 132C with respect to onsite maximizing calibration card 124. For example, optical detector 144 may acquire an RGB image of the multiple dyed samples included in features 132A, 132B, and 132C with respect to onsite maximizing calibration card 124. Onsite processor 140 may apply a color detection method, such as described in greater detail hereinbelow with respect to FIGS. 5-6 to the acquired RGB image to determine the corresponding colorimetric values. Alternatively, the colorimetric values may be measured using an onsite spectrophotometer (not shown).

Thus, in this example there are nine dyed samples, three for each color channel (100%+Δ, 100%, 100%−Δ). Onsite processor 140 determines each colorimetric value for each of the nine dyed samples by interpolating or averaging over these three different measurements respective of orientation. Next, onsite processor 140 determines the onsite effective maximum ink dispensing rate corresponding to the effective maximum colorimetric value for each ink channel of the dyeing machine by interpolating (function f) or otherwise approximating between the three values (100%+Δ, 100%, 100%−Δ):

Next, onsite processor 140 determines the onsite effective maximum ink dispensing rate corresponding to the effective maximum colorimetric value for each ink channel of the dyeing machine by interpolating (function $f$) or otherwise approximating between the three values (100%+Δ, 100%, 100%−Δ):

$$DR_{eff\text{-}factory}^{Cyan} = f_{Cyan}(CV_-, CV_0, CV_+)$$

$$DR_{eff\text{-}factory}^{Magenta} = f_{Magenta}(CV_-, CV_0, CV_+)$$

$$DR_{eff\text{-}factory}^{Yellow} = f_{Yellow}(CV_-, CV_0, CV_+)$$

where CV is the colorimetric value, i.e. the CIELab colorimetric value.

A second iteration may be performed if the ink dispensing rate exceeds the tolerance and its position is at one of the edges. The acquired images are further provided to onsite processor 140, which applies grayscale feature 124A and color-scale feature 124B to correct the image for distortions due shadows, illumination, and the like. A description of an exemplary implementation of this technique is described in greater detail below with respect to FIG. 5.

The above steps are repeated, adjusting the candidate ink dispensing rates for performing the onsite maximizing stage for dyeing machine 102 at each repetition until the onsite effective maximum colorimetric value of the dyed threads match the factory effective maximum colorimetric value associated with dyeing machine 102, calculated above with respect to FIG. 1A. In one embodiment, onsite processor 140 adjusts the ink dispensing rates for dyeing machine 102 automatically, by communicating an electromagnetic control signal to dyeing machine 102 via transceiver 146. In another embodiment, onsite processor 140 adjusts the ink dispensing rates for dyeing machine 102 by indicating a control setting for dyeing machine 102 to a user via a user interface 148. In this case, the user adjusts dyeing machine 102 according to the indicated control setting.

Onsite processor 140 determines multiple ink dispensing rates for performing the onsite linearizing stage based on the determined onsite effective maximum ink dispensing rate determined above. For example, onsite processor 140 may divide the range between 0 and the onsite effective maximum ink dispensing rate for each color channel into n even intervals, where n may vary depending on the color channel. Alternatively, onsite processor 140 may divide the range between 0 and the onsite effective maximum ink dispensing rate for each color channel into N intervals, the size of which depend on the colorimetric response of thread 132 to dyeing by dyeing machine 102 at the respective ink dispensing rate.

As described above with respect to FIG. 1A and curve 300 of FIG. 3, onsite processor 140 calculates the onsite linear ink dispensing rate versus color correspondence as a linear relationship between the onsite ink dispensing rates, DR, and the corresponding colorimetric CIELab value $f_{linONSITE}$(DR). Onsite processor 140 calculates the linear relationship between the multiple onsite ink dispensing rates for the onsite linearizing stage determined above and respective colorimetric values.

For each color channel, dyeing machine 102 dyes portions of thread 132 according to the multiple ink dispensing rates determined for the onsite linearizing stage, similar the technique described above with respect to FIG. 2C. For example, with reference to FIG. 2C, row 262D indicates multiple threads dyed cyan at ink dispensing rates ranging from zero to a maximum, or near maximum (95%) effective ink dispensing rate for cyan; row 262E indicates multiple threads dyed magenta at ink dispensing rates ranging from zero to a maximum or near maximum (95%) effective ink dispensing rate for magenta; and row 256F indicates multiple threads dyed yellow at ink dispensing rates ranging from zero to a maximum or near maximum (95%) effective ink dispensing rate for yellow.

Referring back to FIG. 1B, for each color channel, the threads dyed at the ink dispensing rates determined for the onsite linearizing stage are wound or embroidered accordingly, and placed on onsite linearization calibration card 126, indicated as features 132D, 132E, and 132F. The dyed threads may be positioned according to the respective onsite linearizing ink dispensing rates, i.e. from 0% ink dispensing rate to 100% ink dispensing rate. For example, with reference to FIG. 2D, linearization calibration card 256 is shown disposed with multiple cyan threads, dyed according to varying ink dispensing rates, from a minimal ink dispensing rate ($256C_{MIN}$) to maximum ink dispensing rate ($256C_{MAX}$). As another example, with reference to FIG. 2F, linearizing dispensing calibration card 262 is shown disposed with multiple cyan, magenta, and yellow threads, dyed according to varying ink dispensing rates, from a minimal ink dispensing rate ($262C_{MIN-C}$, $262C_{MIN-M}$, $262C_{MIN-Y}$) to maximum ink dispensing rate ($262C_{MAX-C}$, $262C_{MAX-M}$, $262C_{MAX-Y}$). In one embodiment, linearization calibration card 256 of FIG. 2D is representative of onsite linearization calibration card 126. In another embodiment, linearizing dispensing calibration card 262 of FIG. 2F is representative of onsite linearization calibration card 126.

Referring back to FIG. 1B, optical detector 144 acquires images of factory linearization calibration card 126 with the wound threads 132D, 132E, and 132F dyed according to the ink dispensing rates determined for the onsite linearizing stage. Onsite processor 140 analyzes the acquired images to determine corresponding colorimetric Lab values for wound threads, 132D, 132E, and 132F, such according to the technique described below with respect to FIGS. 5-6. In one embodiment, each color channel is acquired by optical detector 144 separately. For each color channel, the colorimetric CIELab values of the N dyed threads are acquired accordingly, to get ($DR_i$, $CIELab_i$), i=1, . . . , N. Optionally, each measurement per dyed sample may be acquired multiple times and at different orientation angles, and the respective colorimetric values for each of the dyed samples may be determined by interpolating or averaging over multiple measurements respective of orientation. Onsite processor 140 builds a curve by interpolating the measurements obtained from optical detector 144, resulting in an onsite non-linear ink dispensing rate versus color correspondence, $Lab=f_{CURVE\text{-}ONSITE}(DR)$. Onsite processor 140 maps the onsite linear ink dispensing rate versus color correspondence, $f_{LIN\text{-}ONSITE}(DR)$, to the onsite non-linear ink dispensing rate versus color correspondence, using the inverse of the onsite linear ink dispensing rate versus color correspondence calculated above i.e. $DR_{LIN-ONSITE}=f^{-1}(Lab_{LIN})$. Onsite processor 140 uses the linearizing function $DR \rightarrow DR_{LIN-ONSITE}$ to determine a linearizing ink dispensing rate DR for a desired colorimetric value.

Reference is now made to FIG. 2B which is a schematic illustration of an exemplary implementation for maximizing calibration card 254, constructed and operative in accordance with an embodiment of the disclosed technique. Maximizing calibration card 254 includes a central portion 254C configured for placing multiple wound portions of dyed threads, such as threads 132A, 132B and 132C dyed in the onsite calibration phase. In one embodiment, the multiple dyed threads may be placed along central column 254C: i.e. by vertically aligning multiple threads dyed cyan, magenta, and yellow at the ink dispensing rates determined for any of the factory or onsite maximizing stage. For example three dyed samples for each color channel may be positioned along central column 254C. Additional or alternative ink sets corresponding to alternative color channels may be used. In another embodiment, the threads dyed for the maximizing stage for each color channel may be placed on maximizing calibration card 254, and analyzed separately. On either side of central portion 254C are multiple grayscale features 254A, arranged as columns $254A_1 \ldots 254A_6$ and multiple color-scale features 254B, arranged as columns $254B_{Y1}, 254B_{M1}, 254B_{C1}, 254B_{Y2}, 254B_{M2}, 254B_{C2}$, and organized in an interleaving, and contrasting manner according to lighter to darker color and grayscale gradients. In one embodiment, grayscale features $254A_1 \ldots 254A_6$ and color-scale features $254B_{Y1}, 254B_{M1}, 254B_{C1}, 254B_{Y2}, 254B_{M2}, 254B_{C2}$ correspond to grayscale features 124A and color-scale features 124B of onsite maximum calibration card 124 of FIG. 1B. Grayscale columns $254A_1, 254A_2, 254A_3$ are interleaved with color-scale columns $254B_{Y1}, 254B_{M1}, 254B_{C1}$ and arranged in opposing order of light-to-dark gradient on one side of central column 254C, and grayscale columns $254A_4, 254A_5,$ and $254A_6$ are interleaved with color-scale columns $254B_{Y2}, 254B_{M2},$ and $254B_{C2}$ and arranged in opposing order of light-to-dark gradient on the other side of central column 254C. Maximizing calibration card 254 additionally includes multiple fiducials $254D_1, 254D_2, 254D_3, 254D_4$, and which may be used to identify properties of maximum calibration card 254, accordingly, such as printing batch, paper type and the like. It may be noted that the implementation for maximizing calibration card 254 is not meant to be limiting, and other implementations may be used. For example, additional or different color scale features may be printed onto maximizing calibration card 254, relating to a different color ink set for dyeing machine 102. Alternatively, additional or fewer grayscale features 254A may be printed on maximizing calibration card 254, and the arrangement of grayscale features 254A and color scale features 254B on maximizing calibration card 254 may vary.

Reference is now made to FIG. 2D which is a schematic illustration of an exemplary linearizing calibration card 256, constructed and operative in accordance with an embodiment of the disclosed technique. In one embodiment, linearizing calibration card 256 is substantially similar to maximizing calibration card 254. In one embodiment, onsite linearizing calibration card 126 of FIG. 1B is represented by linearizing calibration card 256. Linearizing calibration card 256 includes an area, i.e. central portion 256C configured for placing multiple wound portions of dyed threads 132D, 132E and 132F dyed according to the multiple onsite linearizing ink dispensing rates for the onsite calibration phase of FIG. 1B. In one embodiment, the dyed threads (i.e. shown in cyan) may be aligned along central column 256C from the lightest shade ($256C_{MIN}$) to the darkest shade ($256C_{MAX}$), corresponding to the minimal ink dispensing rate and the maximum ink dispensing rate, respectively. In another embodiment, the threads dyed for the maximizing stage for each color channel may be placed on maximizing calibration card 254, and analyzed separately.

On either side of central portion 254C are multiple grayscale features, arranged as columns 256A and multiple color-scale features arranged as columns 256B and organized in an interleaving, and contrasting manner according to lighter to darker color and grayscale gradients. In one embodiment, grayscale features 256A and color-scale features 256B correspond to grayscale features 126A and color-scale features 124B of onsite linearizing calibration card 126 of FIG. 1B. Grayscale features 256A include six grayscale columns $256A_1, 256A_2, 256A_3, 256A_4, 256A_5,$ and $256A_6$. Color-scale features 256B include six color-scale columns $256B_{Y1}, 256B_{M1}, 256B_{C1}, 256B_{Y2}, 256B_{M2},$ and $256B_{C2}$. Grayscale columns $256A_1, 256A_2, 256A_3$ are interleaved with color-scale columns $256B_{Y1}, 256B_{M1}, 256B_{C1}$ and arranged in opposing order of light-to-dark gradient on one side of central column 256C, and grayscale columns $256A_4, 256A_5,$ and $256A_6$ are interleaved with color-scale columns $256B_{Y2}, 256B_{M2},$ and $256B_{C2}$ and arranged in opposing order of light-to-dark gradient on the other side of central column 256C. Linearizing calibration card 256 additionally includes multiple fiducials $256D_1, 256D_2, 256D_3, 256D_4$, and which may be used to identify linearizing calibration card 256, accordingly.

Reference is now made to FIG. 2E, which is a schematic illustration of an exemplary maximum dispensing calibration card, generally referenced 260, constructed and operative in accordance with another embodiment of the disclosed technique. Maximum dispensing calibration card 260 may be used for determining the onsite effective maximal ink dispensing rate in conjunction with the system of FIG. 1B. The background of maximum dispensing calibration card 260 presents at least one grayscale stripe, shown in FIG. 2E as two grayscale stripes 260A and 260B, spanning the width of maximum dispensing calibration card 260 in opposing grayscale gradients. Overlaid on grayscale stripes 260A and 260B, and placed on an area, such as a central area of maximum dispensing calibration card 260 are threads $260C_1, 260C_2, 260C_3, 260M_1, 260M_2, 260M_3,$ and $260Y_1, 260Y_2, 260Y_3$ dyed according to three respective different maximal ink dispensing rates for the color channels, cyan, magenta, and yellow.

Reference is now made to FIG. 2F, which is a schematic illustration of an exemplary linearizing dispensing calibration card, generally referenced 262, constructed and operative in accordance with another embodiment of the disclosed technique. Linearizing dispensing calibration card 262 may be used to perform the onsite linearizing stage, in conjunction with the system of FIG. 1B. The background of linearizing dispensing calibration card 262 presents at least one grayscale stripe, shown in FIG. 2F as two grayscale stripes 262A and 262B, spanning the width of linearizing dispensing calibration card 262 in opposing grayscale gradients, i.e. the direction of the gradient of the two stripes is opposite such that the lightest and darkest gray shades of the two stripes are in alignment. Overlaid on grayscale stripes 262A and 262B, and placed on an area, such as a central area of linearizing dispensing calibration card 262 are threads $262_{MIN-C}, 262_{MIN-M}, 262_{MIN-Y} \ldots 262_{MAX-C}, 262_{MAX-M}, 262_{MAX-Y}$, dyed according to the varying ink dispensing rates, from minimal to maximal ink dispensing rates for the three respective color channels, cyan, magenta, and yellow. Distortions to the acquired color intensity of the threads due to illumination are corrected using the variable grayscales, by positioning the differently died threads against multiple grayscale stripes having contrasting grayscale gradients from dark to light, and light to dark.

Figure 4A:
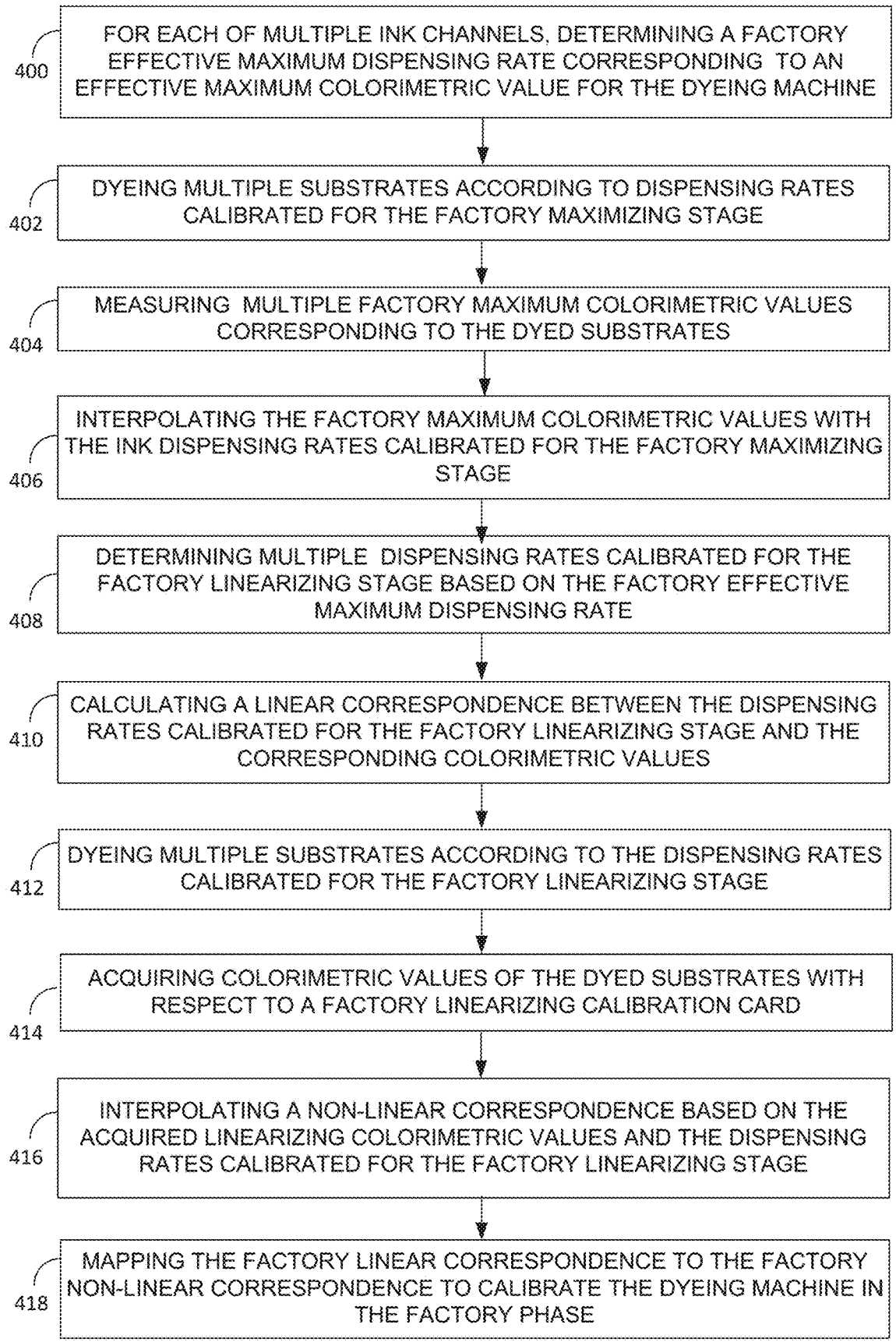
FIGS. 4A-4B together are schematic illustrations of a two-phase calibration method for a dyeing machine, constructed and operative in accordance with an embodiment of the disclosed technique, where FIG. 4B relates to an onsite calibration phase and FIG. 4A relates to a factory calibration phase.
Figure 4B:
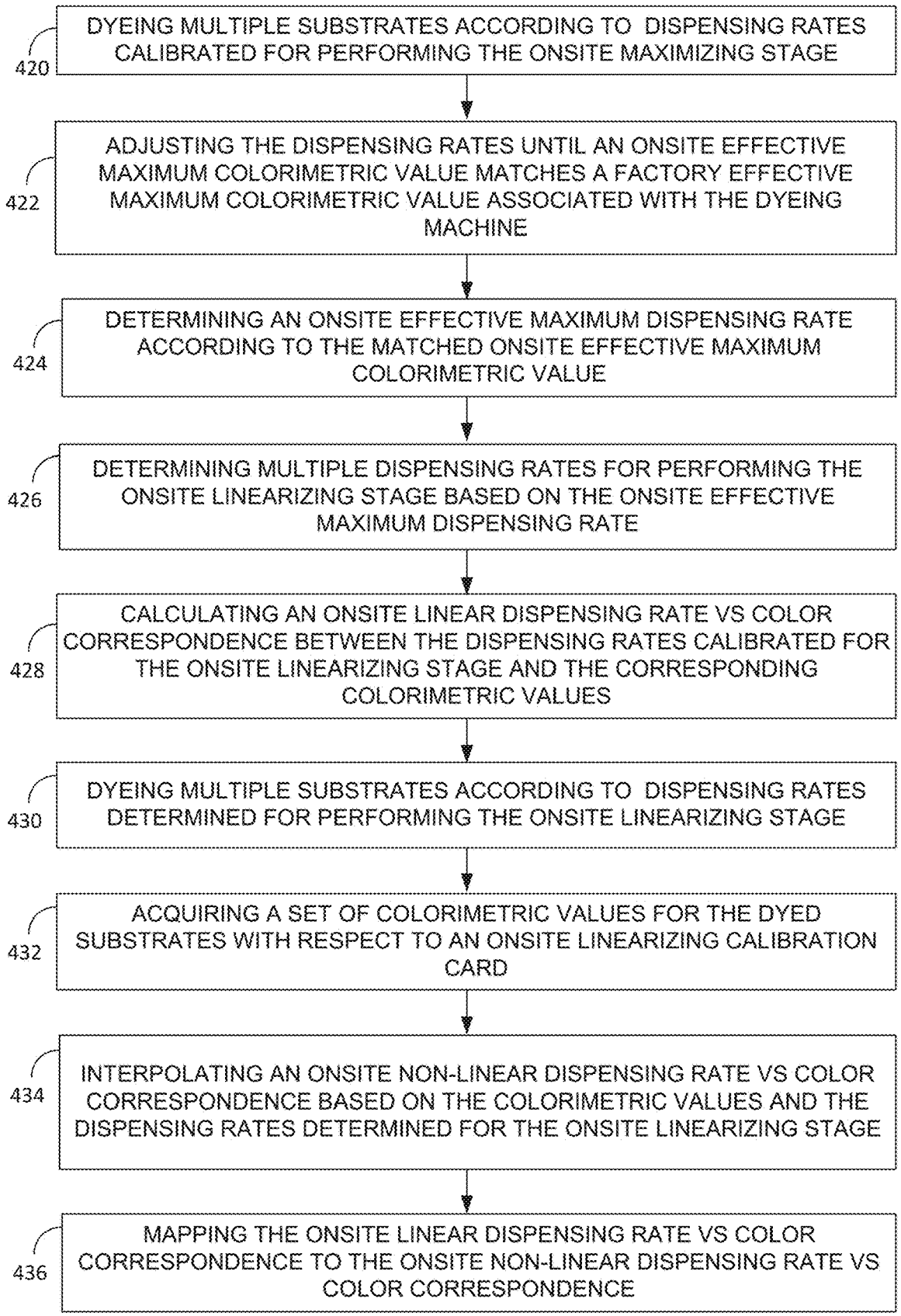

A description of a method for calibrating a dyeing machine now follows. Reference is now made to FIGS. 4A-4B, which together are schematic illustrations of a two-phase calibration method for a dyeing machine, in accordance with an embodiment of the disclosed technique. FIG. 4A describes the factory calibration phase for the dyeing machine, and FIG. 4B described the onsite calibration phase for the dyeing machine.

Typically, the factory calibration phase is performed prior to the onsite calibration phase however this is not intended to be limiting. Each calibration phase includes two stages. The factory calibration phase includes a factory maximizing stage and a factory linearizing stage. The onsite calibration phase includes an onsite maximizing stage and an onsite linearizing stage. In the factory maximizing stage and the onsite maximizing stage, an effective maximum ink dispensing rate corresponding to a target maximum colorimetric value for a dyed substrate is determined. In the factory linearizing stage and the onsite linearizing stage, a linearized mapping is determined between a range of ink dispensing rates and corresponding colorimetric values of substrates dyed accordingly. The term "maximizing substrate" relates to those substrates dyed for the purpose of determining the effective maximum ink dispensing rate. The term "linearizing substrate" relates to those substrates dyed for purpose of determining the linearized mapping. Thus, the "maximizing substrate" and "linearizing substrate" may be different segments of the same spool of thread, having the same underlying physical characteristics, but dyed differently for the different stages of each calibration phase.

Reference is now made to FIG. 4A which is a schematic illustration of a method for a factory calibration phase for the dyeing machine, constructed and operative in accordance with an embodiment of the disclosed technique. The factory calibration phase may be performed prior to the onsite calibration phase in order to determine the factory effective maximum dispensing rate corresponding to an effective maximum colorimetric value for the dyeing machine. The factory effective maximum colorimetric value may be subsequently provided onsite for performing the onsite calibration either by storing the value with the dyeing machine, printing the value on the onsite maximizing calibration card, or by otherwise communicating the value onsite.

In procedure 400, for each of the multiple ink channels, a maximizing stage is performed to determine an effective maximum ink dispensing rate corresponding to an effective maximum colorimetric value for the dyeing machine. With reference to FIG. 1A, factory processor 110 performs the factory maximizing stage on dyeing machine 102 to determine a factory effective maximum ink dispensing rate corresponding to an effective maximum colorimetric value for dyeing machine 102.

In procedure 402, for each of the multiple ink channels, the substrates are dyed according to multiple ink dispensing rates for performing the maximizing stage. With reference to FIG. 1A, thread 112 is dyed according to multiple ink dispensing rates for performing the factory maximizing stage for dyeing machine 102.

In procedure 404, multiple factory maximum colorimetric values corresponding to the dyed substrates are measured by a spectrophotometer. With reference to FIG. 1A, dyeing machine 102 dyes multiple segments of thread 112 multiple colors according to multiple ink dispensing rates for performing the factory maximizing stage. Spectrophotometer 108 acquires multiple factory maximum colorimetric values respective of the multiple segments of thread 112 that were dyed according to the multiple ink dispensing rates for performing the factory maximizing stage. Additional thread types may be similarly dyed by dyeing machine 102 and subsequently measured by spectrophotometer 108.

In procedure 406, the multiple factory maximum colorimetric values are interpolated with the ink dispensing rates for performing the factory maximizing stage. With reference to FIG. 1A, factory processor 110 interpolates the factory maximum colorimetric values with the ink dispensing rates for performing the factory maximizing stage for dyeing machine 102.

In procedure 408, multiple ink dispensing rates for performing the factory linearizing stage are determined based on the factory effective maximum ink dispensing rate of the dyeing machine. With reference to FIG. 1A, factory processor 110 determines multiple ink dispensing rates for performing the linearizing stage for dyeing machine 102 by dividing the factory effective maximum ink dispensing rate into multiple dispensing intervals.

In procedure 410, a factory linear ink dispensing rate versus color correspondence is calculated between the multiple ink dispensing rates for performing the factory linearizing stage and respective colorimetric values. With reference to FIG. 1A, factory processor 110 determines: i) the factory effective maximum ink dispensing rate, ii) multiple ink dispensing rates for performing the factory linearizing stage based on the factory effective maximum ink dispensing rate, and iii) calculates a factory linear ink dispensing rate versus color correspondence. An illustration of the linear correspondence is depicted by linear curve 300 of FIG. 3.

In procedure 412, multiple substrates are dyed according to the ink dispensing rates calibrated for the factory linearizing stage. With reference to FIG. 1A, dyeing machine 102 dyes multiple segments of thread 112 according to the ink dispensing rates determined for performing the factory linearizing stage.

In procedure 414, multiple factory linearizing colorimetric values of the multiple dyed factory linearizing substrates are acquired. With reference to FIG. 1A, spectrophotometer 108 detects the colorimetric values of the respective multiple segments of thread 112 dyed according to the ink dispensing rates determined for performing the factory linearizing stage.

In procedure 416, a factory non-linear ink dispensing rate versus color correspondence is interpolated based on the multiple factory linearizing colorimetric values and the multiple ink dispensing rates calibrated for the factory linearizing stage. With reference to FIG. 1A, factory processor 110 interpolates a factory non-linear ink dispensing rate versus color correspondence based on the factory linearizing colorimetric values acquired by spectrophotometer 108. An illustration of the non-linear correspondence is depicted by non-linear curve 302 of FIG. 3.

In procedure 418, the factory linear ink dispensing rate versus color correspondence is mapped to the factory non-linear ink dispensing rate versus color correspondence, thereby calibrating the dyeing machine in a factory phase. With reference to FIG. 1A, factory processor 110 interpolates a factory non-linear ink dispensing rate versus color correspondence based on the multiple factory linearizing colorimetric values and the multiple factory linearizing ink dispensing rates, and maps the linear ink dispensing rate versus color correspondence to the non-linear ink dispensing rate versus color correspondence. In this manner, factory processor 110 performs a factory calibration for dyeing machine 102. The above steps are repeated for each ink color channel of dyeing machine 102, and for each substrate type. An illustration of the mapping between the linear and non-linear correspondences is depicted by mapping 304 of FIG. 3, mapping linear curve 300 to non-linear curve 302.

Thus determined, the effective maximal ink dispensing rates; nonlinear and linear values for the different ink dispensing rates; and optionally ink concentrations per thread type are stored for each color channel for subsequent use, such as for the onsite calibrations. In one embodiment, these values are stored together with additional machine parameters inside a memory store (not shown) provided with dyeing machine 102. In another embodiment, the values are stored in a centralized database (not shown) that is accessible via a network, such that the values may be obtained for the onsite calibration phase by querying the database with a unique identifier for dyeing machine 102.

Reference is now made to FIG. 4B which is a schematic illustration of a method for an onsite calibration phase for the dyeing machine, in accordance with an embodiment of the disclosed technique. The onsite calibration phase is typically performed after to the factory calibration phase, using the factory effective maximum colorimetric value as a reference. The factory effective maximum colorimetric value may be provided for the onsite calibration phase either by printing the value on the onsite maximizing calibration card, or by providing the value using electromagnetic or optical communications.

In procedure 420, for each of multiple ink channels and each thread type, multiple substrates are dyed according to multiple ink dispensing rates calibrated for performing the onsite maximizing stage. With reference to FIG. 1B and FIG. 2B, dyeing machine 102 dyes multiple segments of thread 132 multiple colors according to multiple ink dispensing rates calibrated for performing the onsite maximizing stage. The multiple dyed segments of thread 132 are positioned on onsite maximizing calibration card 124, corresponding to maximizing calibration card 254.

In procedure 422, the multiple ink dispensing rates determined for performing the onsite maximizing stage for the dyeing machine are adjusted until a colorimetric value of the respectively dyed multiple substrates matches a factory effective maximum colorimetric value associated with the dyeing machine. In one embodiment, multiple colorimetric values are acquired respective of the multiple dyed substrates and an onsite maximizing calibration card. The onsite effective maximum colorimetric value of the multiple dyed substrates is determined by interpolating the multiple acquired colorimetric values with the multiple ink dispensing rates determined for performing the onsite maximizing stage. With reference to FIG. 1B, optical detector 144 of mobile device 142 captures one or more images of the multiple dyed segments of thread 132 positioned on onsite maximizing calibration card 124. Mobile device 142 detects the colorimetric values of the multiple dyed segments of thread 132, as described in greater detail below with respect to FIG. 5. Mobile device 142 determines an adjustment parameter for dyeing machine 102 until the onsite effective maximum colorimetric value of the multiple dyed substrates 132 matches a factory effective maximum colorimetric value associated with the dyeing machine 102.

In procedure 424, an onsite effective maximum ink dispensing rate is determined according to the matched onsite effective maximum colorimetric value. With reference to FIG. 1B, mobile device 142 determines the onsite effective maximum ink dispensing rate according to the matched onsite effective maximum colorimetric value.

In procedure 426, multiple ink dispensing rates for performing an onsite linearizing stage are determined based on the onsite effective maximum ink dispensing rate. With reference to FIG. 1B, mobile device 142 determines multiple ink dispensing rates for performing the onsite linearizing stage by dividing the onsite effective maximum ink dispensing rate into intervals.

In procedure 428, an onsite linear ink dispensing rate versus color correspondence is calculated between the multiple ink dispensing rates calibrated for performing the onsite linearizing stage and the corresponding colorimetric values. With reference to FIG. 1B, onsite processor 140: i) determines the onsite effective maximum ink dispensing rate, ii) determines multiple ink dispensing rates calibrated for performing the onsite linearizing stage based on the onsite effective maximum ink dispensing rate, and iii) calculates an onsite linear ink dispensing rate versus color correspondence An illustration of the linear correspondence is depicted by linear curve 300 of FIG. 3.

In procedure 430, multiple substrates are dyed according to the multiple ink dispensing rates determined for performing the onsite linearizing stage. With reference to FIG. 1B, dyeing machine 102 dyes multiple segments of thread 132 according to the multiple ink dispensing rates calibrated for performing the onsite linearizing stage.

In procedure 432, multiple colorimetric values of the multiple dyed linearizing substrates are acquired with respect to a linearizing onsite calibration card. With reference to FIG. 1B and FIG. 2D, the multiple segments of thread 132 dyed according to the multiple ink dispensing rates determined for performing the onsite linearizing stage are positioned on onsite linearization calibration card 126. Mobile device 142 captures an image of the multiple dyed segments of thread 132 positioned on onsite linearization calibration card 126. Mobile device 142 analyzes the image, such as described in greater detail below with respect to FIG. 5, to detect the colorimetric values of the respective dyed multiple segments of thread 132. Although FIG. 2D illustrates onsite linearization calibration card 126 disposed with multiple threads dyed to varying intensities of cyan, corresponding to the different ink dispensing rates, it is to be understood that the above steps are repeated for each color channel for the ink set of dyeing machine 102. In this case, the process is repeated for magenta and yellow or any other color inks used. Furthermore, onsite linearization calibration card 126 is shown disposed with nine dyed threads per color channel, this is meant to be illustrative only, and fewer or more dyed samples may be measured.

In procedure 434, an onsite non-linear ink dispensing rate versus color correspondence is interpolated based on the multiple onsite linearizing colorimetric values and the multiple ink dispensing rates determined for performing the onsite linearizing stage. With reference to FIG. 1B, onsite processor 140 interpolates a non-linear correspondence between the multiple onsite linearizing colorimetric values and the multiple ink dispensing rates determined for performing the onsite linearizing stage. An illustration of the non-linear correspondence is depicted by non-linear curve 302 of FIG. 3.

In procedure 436, the onsite linear ink dispensing rate versus color correspondence is mapped to the onsite non-linear ink dispensing rate versus color correspondence. With reference to FIG. 1B, onsite processor 140 interpolates an onsite non-linear ink dispensing rate versus color correspondence based on the multiple onsite linearizing colorimetric values and the multiple onsite linearizing ink dispensing rates, and maps the linear ink dispensing rate versus color correspondence to the non-linear ink dispensing rate versus color correspondence. An illustration of the mapping between the linear and non-linear correspondences is depicted by mapping 304 of FIG. 3, mapping linear curve 300 to non-linear curve 302. In this manner, onsite processor 140 performs an onsite calibration for dyeing machine 102.

Figure 4C:
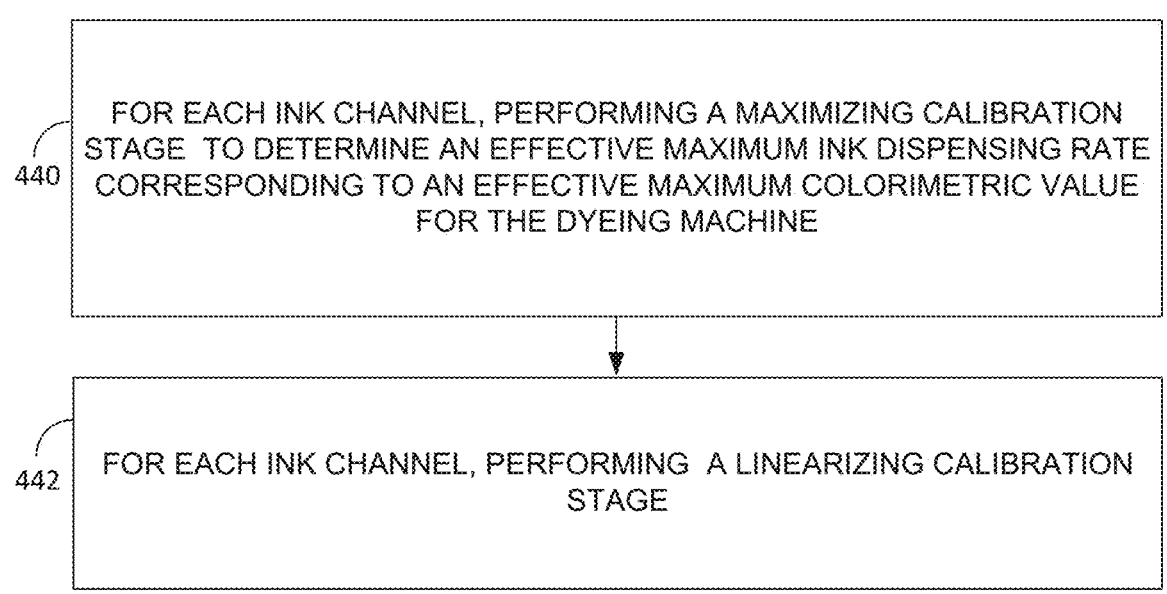
FIG. 4C is a schematic illustration of a two-phase calibration method for a dyeing machine, constructed and operative in accordance with an embodiment of the disclosed technique.

Reference is now made to FIG. 4C, which is a schematic illustration of a method for calibrating a dyeing machine, constructed and operative in accordance with another embodiment of the disclosed technique.

In procedure 440, for each of multiple ink channels for a dyeing machine, a maximizing stage is performed to determine an effective maximum ink dispensing rate corresponding to an effective maximum colorimetric value for the dyeing machine. A more detailed description of a method for performing the maximizing stage is given below with respect to FIG. 4D. Procedure 440 is performed for each of the factory calibration phase and the onsite calibration phase. With reference to FIG. 1A, factory processor 110 performs the factory maximizing stage on dyeing machine 102 to determine a factory effective maximum ink dispensing rate corresponding to an effective maximum colorimetric value for the dyeing machine. With reference to FIG. 1B, onsite processor 140 performs the onsite maximizing stage on dyeing machine 102 to determine an onsite effective maximum ink dispensing rate corresponding to the effective maximum colorimetric value for the dyeing machine.

In procedure 442, a linearizing stage is performed. A more detailed description of a method for performing the linearizing stage is given below with respect to FIG. 4E. Procedure 442 is performed for each of the factory calibration phase and the onsite calibration phase. With reference to FIG. 1A, factory processor 110 performs the factory linearizing stage on dyeing machine 102. With reference to FIG. 1B, onsite processor 140 performs the factory linearizing stage on dyeing machine 102.

Figure 4D:
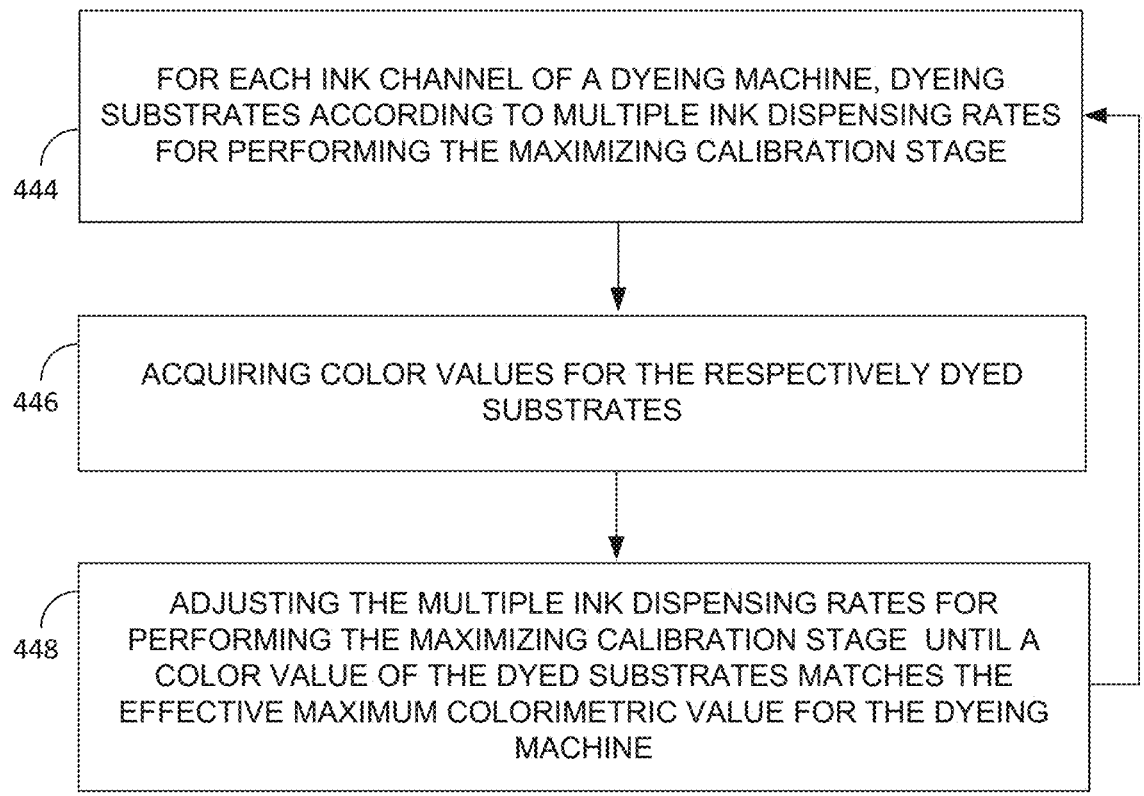
FIG. 4D is a schematic illustration of a method for performing the maximizing stage of FIG. 4C, constructed and operative in accordance with another embodiment of the disclosed technique.

Reference is now made to FIG. 4D, which is a schematic illustration of a method for performing the maximizing stage described in procedure 440 above, constructed and operative in accordance with another embodiment of the disclosed technique. The method of FIG. 4D may be performed at any of the factory calibration phase and the onsite calibration phase.

In procedure 444, for each of the multiple ink channels for the dyeing machine, substrates are dyed according to multiple ink dispensing rates for performing the maximizing stage. With reference to FIG. 1A, thread 112 is dyed according to multiple ink dispensing rates for performing the factory maximizing stage for dyeing machine 102. With reference to FIG. 1B, thread 132 is dyed according to multiple ink dispensing rates for performing the onsite maximizing stage for dyeing machine 102.

In procedure 446, the color values of the substrates dyed in procedure 442 are acquired with respect to a maximizing calibration card. The color values corresponds to either colorimetric values acquired by a spectrophotometer, or alternatively the color values may be RGB values acquired with a camera. When the acquired color values are RGB values, i.e. as obtained by a standard camera, the colorimetric values corresponding to the RGB values may be obtained by applying the method described hereinbelow with respect to FIGS. 5 and 6. These corresponding colorimetric values may be used as the color values for any of the onsite maximization or onsite linearization stages described herein with respect to FIGS. 4A-4E. With reference to FIG. 1A, spectrophotometer 108 acquires the colorimetric values of thread 112 dyed by dyeing machine 102 according to step 442 with respect to factory maximizing calibration card 104. With reference to FIG. 1B, optical detector 144 acquires the color values of thread 132 dyed by dyeing machine 102 according to step 442 with respect to onsite maximizing calibration card 124.

In procedure 448, the multiple ink dispensing rates for performing the maximizing stage are adjusted until a color value of the dyed substrates matches the effective maximum colorimetric value for the dyeing machine. In some embodiments, determining the effective maximum ink dispensing rate for the dyeing machine comprises interpolating multiple maximum ink dispensing rates and multiple maximum color values of multiple respectively dyed substrates. With reference to FIG. 1A, factory processor 110 adjusts the ink dispensing rates for performing the maximizing stage on dyeing machine 102 until the factory effective maximum ink dispensing rate meets a preset tolerance for dyeing machine 102. The colorimetric value corresponding to the factory effective maximum ink dispensing rate is the effective maximum colorimetric value for dyeing machine 102. With reference to FIG. 1B, onsite processor 140 adjusts the ink dispensing rates for performing the onsite maximizing stage on dyeing machine 102 until a color value of thread 132 matches the effective maximum colorimetric value for dyeing machine 102.

Figure 4E:
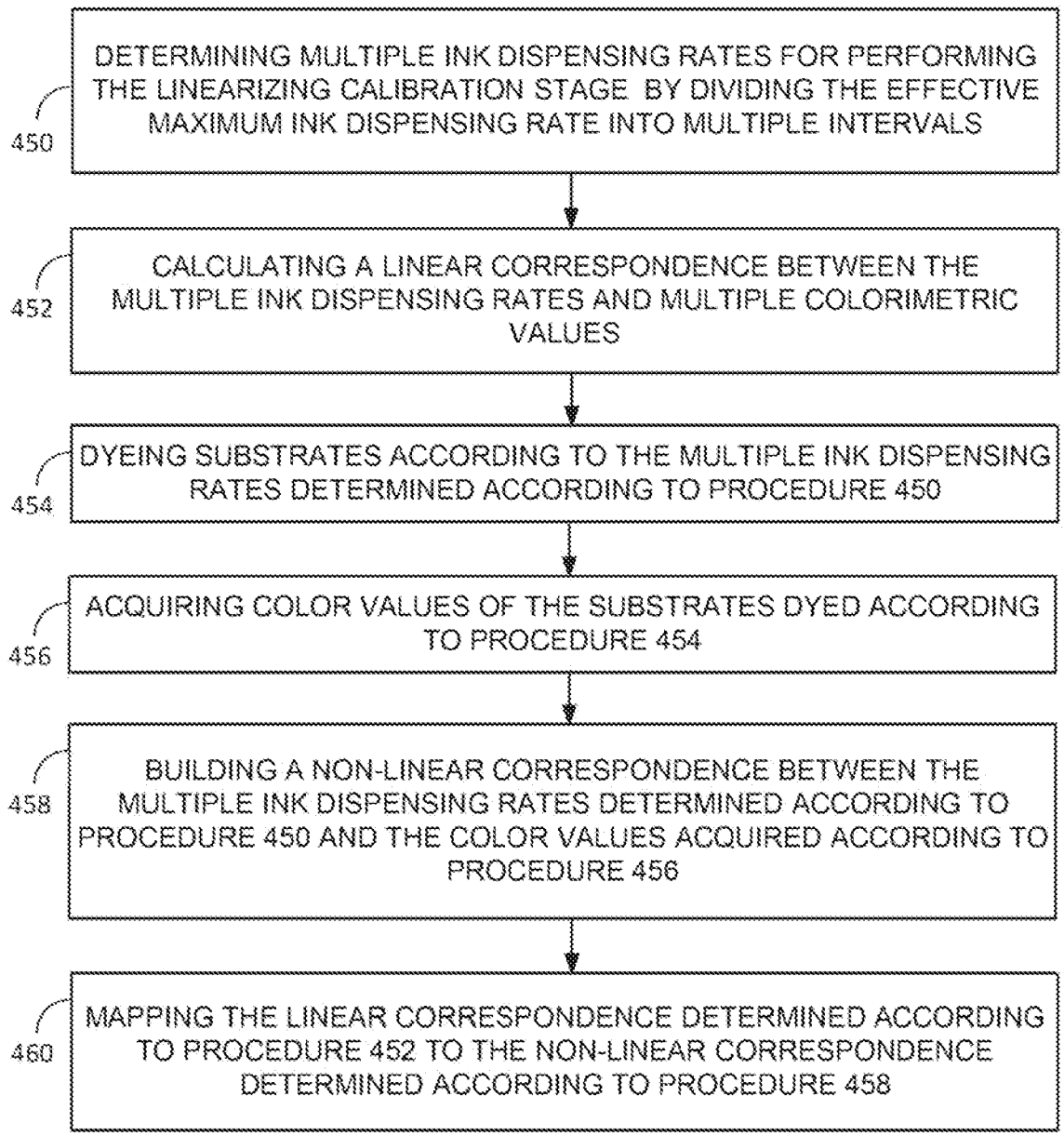
FIG. 4E is a schematic illustration of a method for performing the linearizing stage of FIG. 4C, constructed and operative in accordance with another embodiment of the disclosed technique.

Reference is now made to FIG. 4E, which is a schematic illustration of a method for performing the linearizing stage described in procedure 442 above, constructed and operative in accordance with another embodiment of the disclosed technique.

In procedure 450, for each of the multiple ink channels of the dyeing machine, multiple ink dispensing rates for performing the linearizing stage are determined by dividing the effective maximum ink dispensing rate into multiple intervals. With reference to FIG. 1A, factory processor 110 determines multiple ink dispensing rates for performing the factory linearizing stage on dyeing machine 102 by dividing the effective maximum ink dispensing rate into multiple intervals. With reference to FIG. 1B, onsite processor 140 determines multiple ink dispensing rates for performing the factory linearizing stage on dyeing machine 102 by dividing the effective maximum ink dispensing rate into multiple intervals.

In procedure 452, a linear correspondence between the multiple ink dispensing rates and multiple measured colorimetric values is calculated. With reference to FIG. 1A, factory processor 110 calculates a linear correspondence between the multiple ink dispensing rates and multiple colorimetric values. With reference to FIG. 1B, onsite processor 140 calculates a linear correspondence between the multiple ink dispensing rates and multiple colorimetric values. An exemplary illustration of the linear correspondence is presented by linear curve 300 of FIG. 3.

In procedure 454, a first set of substrates is dyed according to the multiple ink dispensing rates. With reference to FIG. 1A, thread 112 is dyed by dyeing machine 102 according to the multiple ink dispensing rates calculated in procedure 450. With reference to FIG. 1B, thread 132 is dyed by dyeing machine 102 according to the multiple ink dispensing rates calculated in procedure 450.

In procedure 456, color values of the dyed first set of substrates are acquired. The color values corresponds to either colorimetric values acquired by a spectrophotometer, or alternatively the color values may be RGB values acquired with a camera. When the acquired color values are RGB values, i.e. as obtained by a standard camera, the colorimetric values corresponding to the RGB values may be obtained by applying the method described hereinbelow with respect to FIGS. 5 and 6. These corresponding colorimetric values may be used as the color values for any of the onsite maximization or onsite linearization stages described herein with respect to FIGS. 4A-4E. With reference to FIG. 1A, spectrophotometer 108 acquires colorimetric values of thread 112 dyed according to procedure 454. With reference to FIG. 1B, optical detector 144 acquires color values of thread 132 dyed according to procedure 454.

In procedure 458, a non-linear correspondence is built between the multiple ink dispensing rates and the acquired color values. With reference to FIG. 1A, factory processor 110 builds a non-linear correspondence between the multiple ink dispensing rates determined in step 450 and the colorimetric values acquired in step 456. With reference to FIG. 1B, onsite processor 140 builds a non-linear correspondence between the multiple ink dispensing rates determined in procedure 450 and the color values acquired in procedure 456. An exemplary illustration of the linear correspondence is presented by non-linear curve 302 of FIG. 3.

In procedure 460, the linear correspondence is mapped to the non-linear correspondence. With reference to FIG. 1A, factory processor 110 maps the linear correspondence calculated in procedure 452 to the non-linear correspondence built in procedure 458. With reference to FIG. 1A, onsite processor 140 maps the linear correspondence calculated in procedure 452 to the non-linear correspondence built in procedure 458. An exemplary illustration of the mapping between the linear correspondence and the non-linear correspondence is presented by mapping 304 of FIG. 3 which maps linear curve 300 to non-linear curve 302.

In one embodiment, one or more of the above steps are implemented as a computer program product, i.e. a software application, configured with mobile device 142. The instructions of the software application may be stored in memory 150 and executed by at least one processor, i.e. onsite processor 140, factory processor 110, and additional processors, such as cloud processors. On executing the software application, the at least one processor executes the following steps for each of multiple ink channels of dyeing machine 102:

Perform a maximizing stage to determine an effective maximum ink dispensing rate corresponding to the effective maximum colorimetric value for dyeing machine 102.
Perform a linearizing stage for dyeing machine 102.
The linearizing stage for dyeing machine includes the following steps:
  determine multiple ink dispensing rates for performing said linearizing stage by dividing said effective maximum ink dispensing rate into multiple intervals,
  calculate from said effective maximum colorimetric value, a linear correspondence between said multiple ink dispensing rates and multiple calculated colorimetric values,
  obtain color values of a first set of substrates dyed according to said multiple ink dispensing rates,
  interpolate a non-linear correspondence between said multiple ink dispensing rates and said acquired color values, and
  Map said linear correspondence to said non-linear correspondence.

Figure 5:
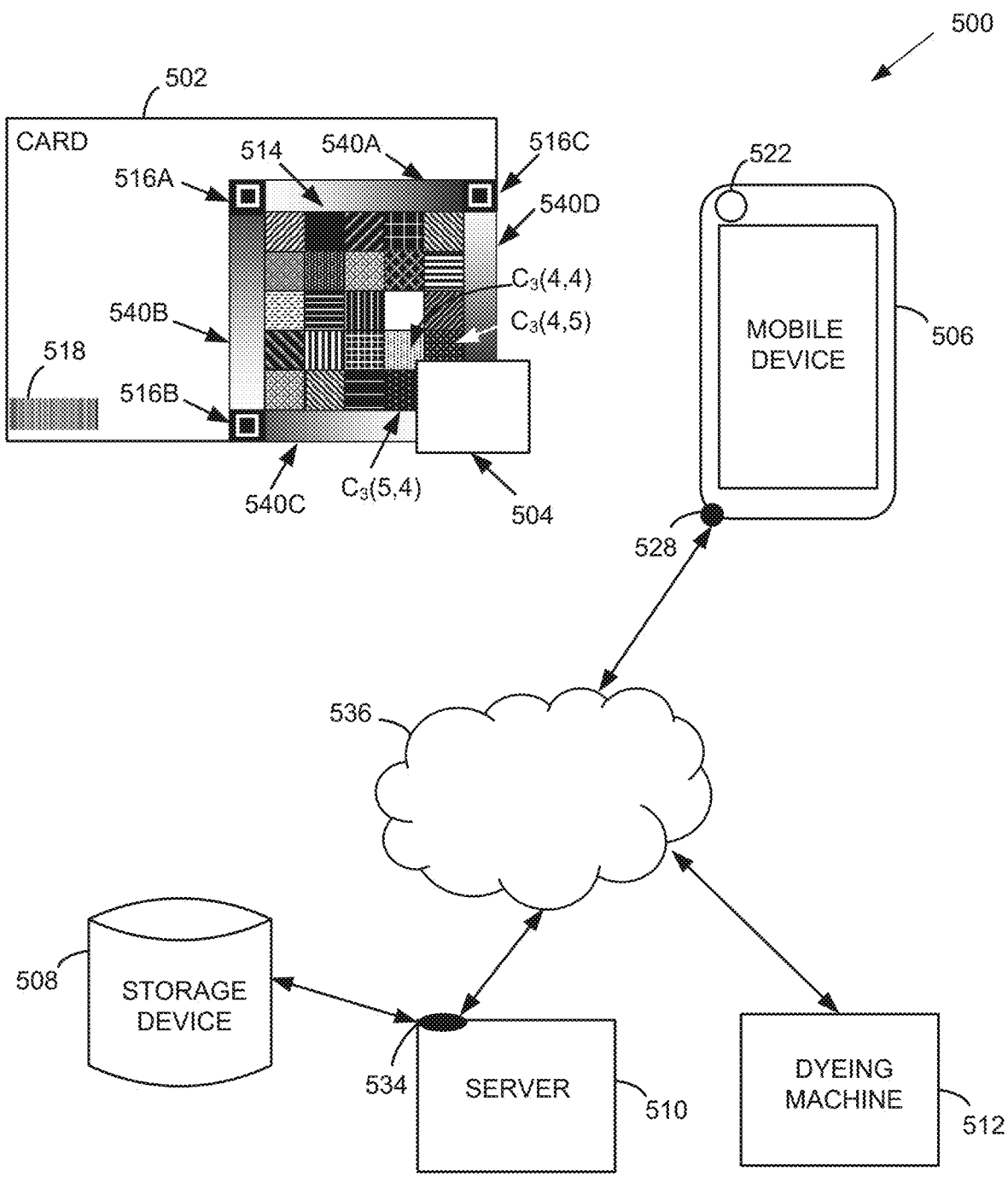
FIG. 5 is schematic illustration of a color detection system for a dyeing machine, constructed and operative in accordance with another embodiment of the disclosed technique.

Reference is now made to FIG. 5, which is schematic illustration of a color detection system 500 for a dyeing machine, constructed and operative in accordance with another embodiment of the disclosed technique. FIG. 5 illustrates system 500 including a card 502, a sample 504, a mobile device 506, a storage device 508, a server 510, a network 536, and a dyeing machine 512. In one embodiment, dyeing machine 512 is a thread dyeing machine, corresponding to thread dyeing machine 102 of FIGS. 1A-1B. Mobile device 508 is equipped at least with a camera 522, a processing unit 520 (not shown) and a transceiver 528. Mobile device 506 may correspond to mobile device 142 of FIG. 1B. Server 510 is equipped at least with a processing unit 530 (not shown) and a transceiver 534. Card 502 has printed thereon at least a color chart 514, fiducials 516A, 516B, and 516C, card identifier 518, and optionally, at least one grayscale stripe, indicated as multiple grayscale stripes 540A, 540B, 540C, and 540D. Sample 504 may correspond to any of the dyed segments of thread 112 of FIG. 1A or thread 132 of FIG. 1B. The operation and componentry of mobile device 506 and server 510 may be represented by respective mobile device 142 of FIG. 1B, and factory processor 110 of FIG. 1A.

The technique described below may be used in conjunction with the calibration technique described above, by replacing card 502 with any of card 254 of FIG. 2B, 256 of FIG. 2D, or card 262 of FIG. 2F, any of which may corresponding to cards 104, 106 of FIG. 1A, and cards 124, 126 of FIG. 1B. Thus, color chart 514 may correspond to any of color-scale features 254B of FIG. 2B, or color-scale features 256B of FIG. 2D, and grayscale stripes 540A, 540B, 540C, and 540D may correspond to any of grayscale features 254A of FIGS. 2B and 256A of FIG. 2D.

Mobile device 506 and server 510 are provided with respective processing units 520 and 530, memories 526 and 532, and transceivers 528 and 534. Processing unit 520 may correspond to onsite processor 140 of FIG. 1B, and processing unit 530 may correspond to factory processor 110 of FIG. 1A. Mobile device 506 is additionally provided with a user interface knot indicated) and camera 522, corresponding to UI 148 and camera 144 of FIG. 1C. Mobile device 506 and server 510 are operative to communicate with each other via respective transceivers 528 and 534 and network 536. Each of processing units 520 and 530 of respective mobile device 506 and server 510 are operative to store one or more program code instructions and data, such as images and processed images, in memories 526 and 532.

Mobile device 506 is communicatively coupled to server 510 via network 536 that may include any combination of a public network such as the Internet, as well as private, local and remote networks. Server 510 is in communication with storage device 508, and with dyeing machine 512 via transceiver 534. Optionally, server 510 communicates with dyeing machine 512 via network 536. Mobile device 406 is positioned within visible range of card 502 and a sample 504. Sample 504 may a dyed and wound thread segment, such as described above with respect to thread 112 of FIG. 1A, or thread 132 of FIG. 1B. Sample 404 is placed adjacent to, or on card 402, in proximity to color chart 414 and grayscale stripes 440C and 440D.

Camera 522 acquires an image of sample 504 positioned thus, flush against color chart 514 of card 502. The disclosed technique imposes no special illumination requirements for acquiring the image by camera 522 for the purpose of detecting the color of sample 504. Mobile device 506 stores the acquired image in memory 526 of mobile device 506, where the acquired image is defined as color pixel values ($R_{IMG}$, $G_{IMG}$, $B_{IMG}$) in an RGB color space. Processing unit 420 detects the pixel representation of color chart 514, ($R_{CC}$, $G_{CC}$, $B_{CC}$), grayscale stripes 540A, 540B, 540C, and 540D, ($R_{GS}$, $G_{GS}$, $B_{GS}$), and the pixel representation of sample 504, ($R_S$, $G_S$, $B_S$), in the acquired image pixels ($R_{IMG}$, $G_{IMG}$, $B_{IMG}$), such as by detecting the pixel representation of fiducials 516A, 516B, and 516C. Processing unit 520 of mobile device 506 applies one or more pre-processing procedures to the above detected pixel representations of the respective features of card 502:

Processing unit 520 of mobile device 506 crops the pixel representation of color chart 514, ($R_{CC}$, $G_{CC}$, $B_{CC}$), grayscale stripes 540A, 540B, 540C, and 540D, ($R_{GS}$, $G_{GS}$, $B_{GS}$), and sample 504, ($R_S$, $G_S$, $B_S$) from the acquired image pixels ($R_{IMG}$, $G_{IMG}$, $B_{IMG}$).

Processing unit 520 of mobile device 506 rectifies the cropped pixel representation of color chart 514, grayscale stripes 540A, 540B, 540C, and 540D and sample 504, such as such as by applying an affine transformation to correct for distortion due to the angle of camera 522 with respect to card 502 and sample 504.

In another embodiment, to correct the pixel representation of color chart 514, processing unit 520 of mobile device 506 determines a box defining each pixel representation of each color square $C_1$ (i, j) of color chart 514, where the size of the box is a function of the resolution of the acquired image. For each color square $C_1$ (i, j), processing unit 520 of mobile device 506 determines the average RGB value for the pixels within the defined box, while omitting pixels situated at the border between any adjacent color squares $C_1$(i, j). Processing unit 520 of mobile device 506 assigns each respective pixel of each color square $C_1$(i, j) the average RGB value. Similarly, processing unit 520 of mobile device 506 determines the average pixel value for the pixel representation of sample 504, while omitting pixels situated at the border between sample 504 and color chart 514 from the average value. Processing unit 520 of mobile device 506 assigns the average value to the pixels of the pixel representation of sample 504. While computing the average RGB value of sample 504, processing unit 520 of mobile device 506 may assess the distortion due to shadows inherent in the pixel representation of sample 504. If the distortion due to shadows is within a predefined threshold, processing unit 520 of mobile device 506 displays the rectified, cropped pixel representation of color chart 514 at the UI of mobile device 506. Otherwise, if the distortion due to shadows crosses the predefined threshold, processing unit 520 of mobile device 506 may alert the user of mobile device 506 to acquire another image. The resulting pre-processed pixel representations of color chart 514, grayscale stripes 540A, 540B, 540C, and 540D, and sample 504 are denoted as ($R^{preProc}_{CC}$, $G^{preProc}_{CC}$, $B^{preProc}_{CC}$), ($R^{preProc}_{GS}$, $G^{preProc}_{GS}$, $B^{preProc}_{GS}$), $R^{preProc}_S$, $G^{preProc}_S$, $B^{preProc}_S$), respectively. Mobile device 506 provides the pre-processed image data including at least the rectified and correct image pixels of color chart 514 ($R^{preProc}_{CC}$, $G^{preProc}_{CC}$, $B^{preProc}_{CC}$) sample 504 ($R^{preProc}_S$, $G^{preProc}_S$, $B^{preProc}_S$), grayscale ($R^{preProc}_{CC}$, $G^{preProc}_{CC}$, $B^{preProc}_{CC}$), ($R^{preProc}_{GS}$, $G^{preProc}_{GS}$, $B^{preProc}_{GS}$), ($R^{preProc}_S$, $G^{preProc}_S$, $B^{preProc}_S$), and card identifier 518 to server 510 via respective transceivers 528 and 534.

In another implementation, one or more of the aforementioned pre-processing procedures are performed by server 510. For example, on one such implementation, mobile device 506 transmits the raw image data acquired by camera 522 to server 510 via respective transceivers 528 and 534, and server 510 applies the respective pre-processing procedures described hereinabove to the raw image data.

Storage device 508 stores ground truth (GT) reference data corresponding to card 502 in association with card identifier 518. The reference data for card 502 relates to factors that may influence the visual perception of the printed colors of color chart 514 and grayscale stripes 540A, 540B, 540C, and 540D, such as data relating to the type of paper for card 502, the type of ink used to print card 502, the printing batch number for card 502, and the like. The GT reference data further includes colorimetric data acquired in advance under controlled illumination using a spectrophotometer (not shown), and stored in a device independent color-space such as CIELab, CIEXYZ, and like, referred to hereinafter as colorimetric "ground truth" (GT) data. In one embodiment, the colorimetric ground truth data for color chart 514 and grayscale stripes 540A, 540B, 540C, and 540D of card 502 correspond to the absolute colorimetric color space data for each color square of color chart 514 in the GT color space coordinates, as acquired by the spectrophotometer, i.e. ($L_{GT\text{-}CC}$, $a_{GT\text{-}CC}$, $b_{GT\text{-}CC}$) for the GT data for color chart 514, and ($L_{GT\text{-}GS}$, $a_{GT\text{-}GS}$, $b_{GT\text{-}GS}$) for the GT data for grayscale stripes 540A, 540B, 540C, and 540D. Storage device 508 additionally includes GT RGB reference data for color chart 514, and grayscale stripes 540A, 540B, 540C, and 540D, ($R_{GT\text{-}GS}$, $G_{GT\text{-}GS}$, $B_{GT\text{-}GS}$), The GT RGB reference data for color chart 514, and grayscale stripes 540A, 540B, 540C, and 540D may be determined at the time of manufacturing card 502. In one embodiment, the RGB values of color chart 514, and grayscale stripes 540A, 540B, 540C, and 540D may be printed on card 402, and may be subsequently provided to server 510 in the acquired image.

In another embodiment, storage device 508 stores relative colorimetric GT coordinates for each colored square of color chart 514 and grayscale stripes 540A, 540B, 540C, and 540D for card 502, i.e. ($L^{Rel}_{GT\text{-}CC}$, $a^{Rel}_{GT\text{-}CC}$, $b^{Rel}_{GT\text{-}CC}$), and ($L^{Rel}_{GT\text{-}GS}$, $a^{Rel}_{GT\text{-}GS}$, $b^{Rel}_{GT\text{-}GS}$), respectively, such as may be determined by applying a chromatic adaptation transform such as Bradford transform or CIECAM02 to the absolute colorimetric GT data. The chromatic adaptation transform may be applied in accordance with the method described above with respect to FIGS. 1A-1D. Similarly, storage device 508 may store GT RGB coordinates for grayscale stripes 540A, 540B, 540C, and 540D for card 502, i.e. ($R_{GT\text{-}GS}$, $G_{GT\text{-}GS}$, $B_{GT\text{-}GS}$), respectively.

Processing unit 530 of server 510 analyzes the pre-processed image data received from mobile device 506 via respective transceivers 534 and 528, and identifies the pixel representation of card identifier 518. Processing unit 530 of server 510 uses the pixel representation of card identifier 518 to determine a search query corresponding to the reference data for card 502. In one embodiment, processing unit 530 of server 510 queries storage device 508 with the search query via transceiver 534, and retrieves the relative colorimetric GT reference data for color chart 514 ($L^{Rel}_{GT\text{-}CC}$, $a^{Rel}_{GT\text{-}CC}$, $b^{Rel}_{GT\text{-}CC}$), the relative colorimetric GT reference data for grayscale stripes 540A, 540B, 540C, and 540D ($L^{Rel}_{GT\text{-}GS}$, $a^{Rel}_{GT\text{-}GS}$, $b^{Rel}_{GT\text{-}GS}$), and the GT RGB components of color chart 514, and grayscale stripes 540A, 540B, 540C, and 540D i.e. ($R_{GT\text{-}GS}$, $G_{GT\text{-}GS}$, $B_{GT\text{-}GS}$).

In another embodiment, processing unit 530 of server 510 queries storage device 508 with the search query via transceiver 534, and retrieves the absolute GT colorimetric reference data for color chart 514 ($L_{GT\text{-}CC}$, $a_{GT\text{-}CC}$, $b_{GT\text{-}CC}$), the absolute GT colorimetric reference data for grayscale stripes 540A, 540B, 540C, and 540D ($L_{GT\text{-}GS}$, $a_{GT\text{-}GS}$, $b_{GT\text{-}GS}$), and the GT RGB components of grayscale stripes 540A, 540B, 540C, and 540D i.e. ($R_{GT\text{-}GS}$, $G_{GT\text{-}GS}$, $B_{GT\text{-}GS}$).

Processing unit 530 of server 510 computes the respective relative GT colorimetric reference data from the retrieved absolute colorimetric reference data, such as by applying a Bradford transformation or CieCam02. Processing unit 530 of server 510 performs two grayscale illumination correction steps. In a first grayscale illumination correction step, processing unit 530 uses the GT RGB components retrieved from storage device 508 to apply a first grayscale illumination correction transformation to the pixel representation of grayscale stripes 540A, 540B, 540C, and 540D received from mobile device 506: processing unit 530 averages the pixel values in the pixel representation of grayscale stripes 540A, 540B, 540C, and 540D received from mobile device 506, i.e. ($R_{GS}^{preProc}$, $G_{GS}^{preProc}$, $B_{GS}^{preProc}$) having a common value to ground truth pixel values ($R_{GT\text{-}GS}$, $G_{GT\text{-}GS}$, $B_{GT\text{-}GS}$) to obtain ($R_{GS}^{Corr}$, $G_{GS}^{Corr}$, $B_{GS}^{Corr}$).

In a second grayscale illumination correction step, processing unit 530 of server 510 uses the results of the first correction step to correct the pixel representation of color chart 514 and sample 504: processing unit 530 of server 510 determines a grayscale transformation by fitting a curve ($f_r$, $f_g$, $f_b$) between the GT RGB reference data retrieved from storage device 508 for grayscale stripes 540A, 540B, 540C, and 540D, i.e. ($R_{GT\text{-}GS}$, $G_{GT\text{-}GS}$, $B_{GT\text{-}GS}$), and the processed pixel values for 540A, 540B, 540C, and 540D as determined from the acquired image, i.e. ($R_{GS}'$, $G_{GS}'$, $B_{GS}'$), such as by applying regression analysis, or spline interpolation:

$$R_{GS}'^{Corr} = f_r(R_{GT\text{-}GS})$$

$$G_{GS}'^{Corr} = f_g(G_{GT\text{-}GS})$$

$$B_{GS}'^{Corr} = f_b(B_{GT\text{-}GS})$$

Processing unit 530 of server 510 computes the second grayscale transformation as the inverse to the fitted curve ($f_r$, $f_g$, $f_b$), i.e. ($f_r^{-1}$, $f_g^{-1}$, $f_b^{-1}$) Processing unit 530 of server 510 applies the second grayscale transformation to the pre-processed pixel values for color chart 514, and sample 504 obtained from the acquired image:

$$(R_{CC}^{RelCorr}, G_{CC}^{RelCorr}, B_{CC}^{RelCorr}) = (f_r^{-1}(R_{CC}^{preProc}), f_g^{-1}(G_{CC}^{preProc}), f_b^{-1}(B_{CC}^{preProc}))$$

$$(R_S^{RelCorr}, G_S^{RelCorr}, B_S^{RelCorr}) = (f_r^{-1}(R_S^{preProc}), f_g^{-1}(G_S^{preProc}), f_b^{-1}(B_S^{preProc}))$$

Processing unit 530 of server 510 uses the obtained relative colorimetric GT reference data for color chart 514 ($L_{GT\text{-}CC}^{Rel}$, $a_{GT\text{-}CC}^{Rel}$, $b_{GT\text{-}CC}^{Rel}$) to build a color transformation where the grayscale corrected pixel values are used to detect the color of sample 404, as follows:

Processing unit 530 of server 510 converts the grayscale corrected pixel values for color chart 514 and sample 504 to the same color space as the reference data. For example, processing unit 530 of server 510 converts the grayscale corrected pixel values ($R_{CC}^{RelCorr}$, $G_{CC}^{RelCorr}$, $B_{CC}^{RelCorr}$), and ($R_S^{RelCorr}$, $G_S^{RelCorr}$, $B_S^{RelCorr}$) for color chart 514 and sample 504, respectively, to respective relative colorimetric GT color-space coordinates ($L_{CC}^{RelCorr}$, $a_{CC}^{RelCorr}$, $b_{CC}^{RelCorr}$) and ($L_S^{RelCorr}$, $a_S^{RelCorr}$, $b_S^{RelCorr}$).

Processing unit 530 of server 510 may apply a least squares method between the grayscale corrected colorimetric space pixel values for color chart 514 ($L_{CC}^{RelCorr}$, $a_{CC}^{RelCorr}$, $b_{CC}^{RelCorr}$) and the relative colorimetric GT reference pixel values ($L_{GT\text{-}CC}^{Rel}$, $a_{GT\text{-}CC}^{Rel}$, $b_{GT\text{-}CC}^{Rel}$) for color chart 514, as follows:

$$\min \| P_c(L_{CC}^{RelCorr}, a_{CC}^{RelCorr}, b_{CC}^{RelCorr}) - (L_{GT\text{-}CC}^{RelCorr}, a_{GT\text{-}CC}^{RelCorr}, b_{GT\text{-}CC}^{RelCorr}) \|$$

to build a three-dimensional model between the grayscale corrected color-space coordinates of color chart 514, ($L_{CC}^{RelCorr}$, $a_{CC}^{RelCorr}$, $b_{CC}^{RelCorr}$), and the relative colorimetric GT ground truth color-space coordinates retrieved from storage device 508, ($L_{GT\text{-}CC}^{Rel}$, $a_{GT\text{-}CC}^{Rel}$, $b_{GT\text{-}CC}^{Rel}$):

$$L_{GT\text{-}CC}^{\widetilde{Rel}} = P_L(L_{CC}^{RelCorr}, a_{CC}^{RelCorr}, b_{CC}^{RelCorr})$$

$$a_{GT\text{-}CC}^{\widetilde{Rel}} = P_a(L_{CC}^{RelCorr}, a_{CC}^{RelCorr}, b_{CC}^{RelCorr})$$

$$b_{GT\text{-}CC}^{\widetilde{Rel}} = P_b(L_{CC}^{RelCorr}, a_{CC}^{RelCorr}, b_{CC}^{RelCorr})$$

where ($P_L$, $P_a$, $P_b$) describe the vector transformation $\vec{P}_{Lab}$.

Processing unit 530 of server 510 applies the transformation to the pixel values for sample 504 to estimate the grayscale corrected color of sample 504 in the device independent GT color space:

$$Lab_{Est} = \vec{P}_{Lab}(L_S^{RelCorr}, a_S^{RelCorr}, b_S^{RelCorr})$$

Processing unit 530 of server 510 converts the color coordinates for sample 504 from the GT color-space to a RGB color-space for display purposes, thereby detecting the RGB color for sample 504. The RGB value is determined such that it is within the color gamut of dyeing machine 512. Optionally, processing unit 530 of server 510 performs the mapping in accordance with one or more characteristics of a dyeing substrate suitable for dyeing by dyeing machine 512. For example, the dyeing substrate may be a thread, and dyeing machine 512 may be a thread dyeing machine.

Processing unit 530 of server 510 stores the detected RGB color of sample 504 at storage device 508, and provides the detected RGB color to mobile device 506 via respective transceivers 528 and 534, and network 536. Mobile device 506 displays the detected RGB color of sample 504 at the user interface. Optionally, processing unit 530 of server 510 converts the detected RGB color to a subtractive color space, such as CMY, CMYK, or CMY(K) color spaces for dyeing machine 512. Additionally or alternatively, processing unit 530 may apply a deep learning method with any of the methods described herein, to estimate the illumination when camera 522 acquires the image of card 502 with sample 504, such as by building a neural network using training data for card 502 acquired under varying illuminations, orientations, and noise conditions, using a range of different types of cameras and mobile devices.

Figure 6:
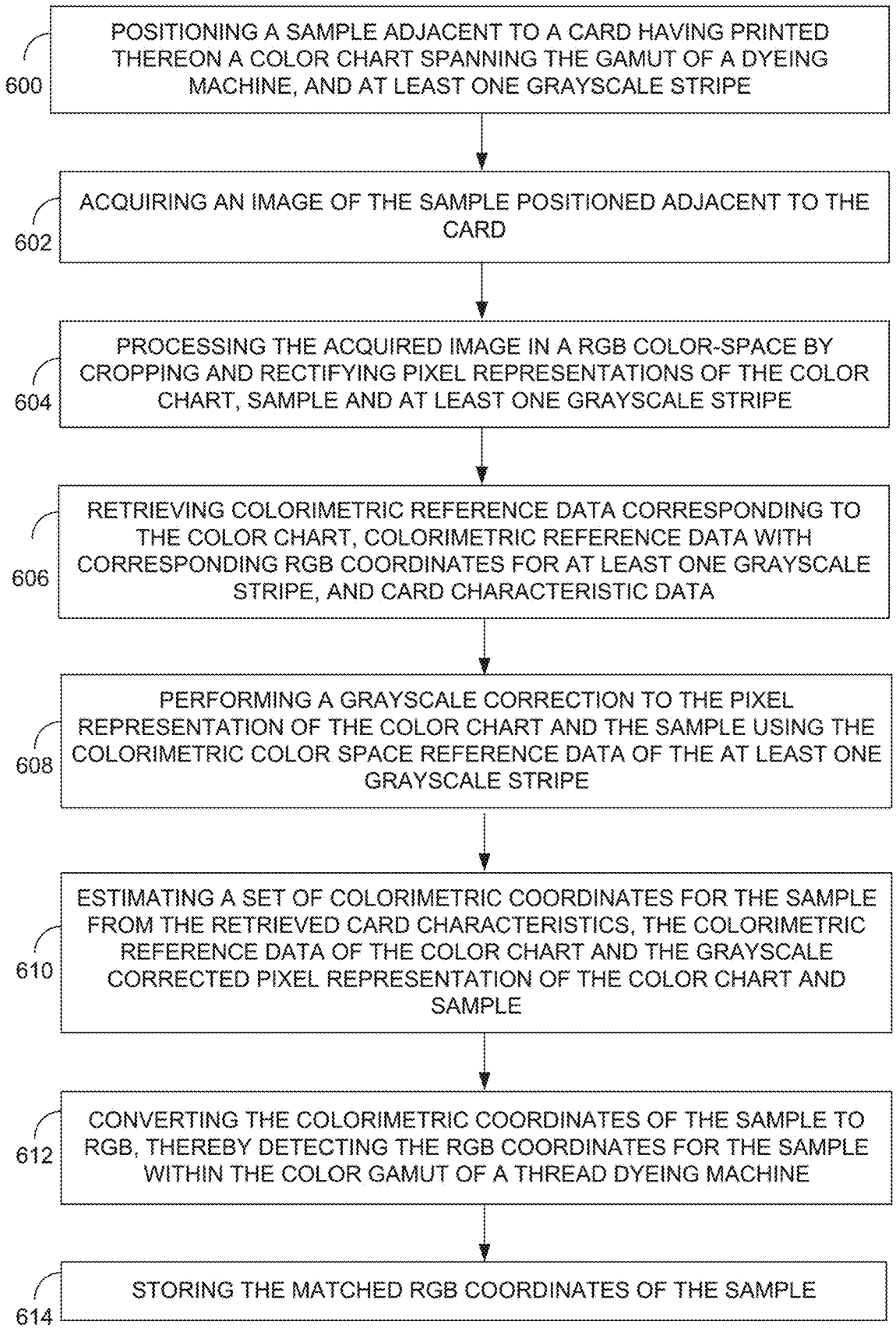
FIG. 6 is a schematic illustration of a color detection method, in accordance with an embodiment of the disclosed technique.

A description of a method for detecting a color for a dyeing machine, constructed and operative in accordance with an embodiment of the disclosed technique, now follows. Reference is now made to FIG. 6, which is a schematic illustration of a method for detecting a color of a sample for a dyeing machine.

In procedure 600, a sample is positioned adjacent to a card having printed thereon a color chart spanning a color gamut of a dyeing machine and at least one grayscale stripe. In one embodiment, the at least one grayscale stripe is positioned at an edge of the card. The sample may be positioned at a cutout portion of the card disposed flush against the color chart and the at least one grayscale stripe. The at least one grayscale stripe may comprise four grayscale stripes framing the color chart. In one embodiment, the cutout portion abuts three different squares of the color chart, and two different grayscale stripes.

In procedure 602, an image of the sample positioned adjacent to the card is acquired.

In procedure 604, the acquired image is processed in a RGB color-space by cropping and rectifying pixel representations of the color chart, the sample, and the at least one grayscale stripe in the image. In one embodiment, correcting the pixel representation of the color chart in the image comprises determining a box defining each color square of the pixel representation of said color chart, determining for each box, an average RGB value for pixels inside the box, where the average RGB value omits RBG values of pixels situated at the border between two adjacent color squares of the pixel representation of the color chart, and assigning each respective pixel of each color square the average RGB value.

With reference to the system of FIG. 5, card 502 is provided, having printed thereon a color chart 514 spanning a color gamut of dyeing machine 512, and optionally, grayscale stripes 540A, 540B, 540C, and 540D. Card 502 is additionally provided with a cutout portion. A sample 504, such as a piece of fabric, paper, and the like is positioned at the cutout portion, flush against color chart 514, such that sample 504 is adjacent to at least two color squares C3(4,5) and C3(5,4) and at least two grayscale stripes 540C and 540D of color chart 514. In one implementation, sample 504 is adjacent to three color squares C3(4,5), C3(4,4) and C3(5,4) and at least two grayscale stripes 540C and 540D of color chart 514. Camera 522, integrated with mobile device 506, is positioned within an optical range of card 502 and sample 504. Camera 522 acquires an image of sample 504 positioned thus, flush against color chart 514 and grayscale stripes 540C and 540D of card 502. In one implementation, processing unit 520 of mobile device 506 processes the acquired image in the RGB color-space by white balancing the acquired image, and by rectifying a pixel representation of color chart 514 and grayscale stripes 540C and 540D of the acquired image. Mobile device 506 provides the processed image to server 510 via respective transceivers 528 and 534. In another implementation, mobile device 506 provides the acquired raw image data to server 510 via respective transceivers 528 and 534, and processing unit 530 of server 510 processes the acquired image in the RGB color-space by white balancing the acquired image, and by rectifying a pixel representation of color chart 514 and grayscale stripes 540C and 540D of the acquired image.

In procedure 606, colorimetric reference data corresponding to the color chart of the card, colorimetric reference data with corresponding RGB coordinates for the at least one grayscale stripe of the card, and the card characteristic data corresponding to the card are retrieved.

With reference to the system of FIG. 5, storage device 508 stores the colorimetric reference data corresponding to color chart 514, and colorimetric reference data with the corresponding RGB coordinates for grayscale stripes 540A, 540B, 540C, and 540D, and card characteristic data corresponding to the card. Processing unit 530 of server 510 analyzes the processed image to identify card identifier 518 of the processed image. Processing unit 530 of server 510 uses card identifier 518 to query the database and retrieve from storage device 508 the colorimetric reference data for color chart 514, colorimetric data with the corresponding RGB coordinates for grayscale stripes 540A, 540B, 540C, and 540D, and card characteristic data corresponding to card 502 via transceiver 534.

In procedure 608, a grayscale illumination correction is performed to the pixel representation of the color chart and the sample in the image using the RGB coordinates corresponding to the colorimetric reference data of the at least one grayscale stripe of the card. In one embodiment, performing the grayscale illumination correction comprises performing a first grayscale correction step applied to the pixel representation of the at least one grayscale stripe, and performing a second grayscale correction step applied to the pixel representation of the color chart and said sample.

In procedure 610, a set of colorimetric coordinates for the sample is estimated from the retrieved card characteristic data, the colorimetric reference data, and the grayscale illumination corrected pixel representation of the color chart and the sample.

In procedure 612, the color coordinates of the sample in the device independent color space are converted to a RGB color space, thereby detecting the RGB color coordinates for the sample, where the RGB color coordinates are within a color gamut of a dyeing machine. One or more characteristics of a dyeing substrate, such as a thread, may also be applied to any of the converting or estimating steps.

In procedure 614, the detected RGB color space coordinates of the sample are stored. The detected color in the RGB color space coordinates may be subsequently displayed. Additionally, the detected color in the RGB color space coordinates may be subsequently converted to a subtractive color space, such as CMY, CMYK, or CMY(K)+ and provided for dyeing a substrate, accordingly.

With reference to the system of FIG. 5, processing unit 530 of server 510 performs a grayscale illumination correction to the pixel representation of color chart 514 and sample 504 using the RGB color space reference data of at least one of grayscale stripes 540A, 540B, 540C, and 540D of card 502. Processing unit 530 of server 510 estimates a set of color coordinates for sample 504 in the colorimetric color-space from the grayscale illumination corrected pixel representation of color chart 514 and sample 504 and the colorimetric reference data corresponding to the color chart 514 retrieved from storage device 508. Processing unit 530 of server 510 converts the color coordinates of sample 504 from the device independent color space to a RGB color space that is within a color gamut of dyeing machine 512, thereby detecting the RGB color-space coordinates for sample 504, wherein the RGB color-space coordinates are within a color gamut of dyeing machine 512. Processing unit 530 of server 510 stores the detected RGB color space coordinates at storage device 508, and provides the detected RGB color to mobile device 506 via respective transceivers 528 and 534, and network 536. Mobile device 506 displays the detected RGB color at the user interface. Processing unit 530 additionally converts the detected RGB color a subtractive color space, and provides the detected color to dyeing machine 512.

It will be appreciated by persons skilled in the art that the disclosed technique is not limited to what has been particularly shown and described hereinabove. Rather the scope of the disclosed technique is defined only by the claims, which follow.

What is claimed is:

1. A method for calibrating a dispensing rate for a dyeing machine, the method comprising:
   for each of multiple ink channels of a dyeing machine:
   performing a maximizing stage, comprising determining an effective maximum ink dispensing rate corresponding to an effective maximum colorimetric value for said dyeing machine;
   performing a linearizing stage, comprising:
   determining multiple ink dispensing rates for said linearizing stage by dividing said effective maximum ink dispensing rate into multiple intervals;
   calculating a linear correspondence between said multiple ink dispensing rates and multiple measured colorimetric values;

dyeing a first set of substrates according to said multiple ink dispensing rates, acquiring color values of said dyed first set of substrates;

building a non-linear correspondence between said multiple ink dispensing rates and said acquired color values; and mapping said linear correspondence to said non-linear correspondence.

2. The method of claim 1, wherein said maximizing stage and said linearizing stage are performed at each of a factory phase and an onsite phase, wherein results from said factory phase are used for performing said onsite phase.

3. The method of claim 1, wherein said maximizing stage further comprises:

dyeing a second set of substrates according to multiple ink dispensing rates for performing said maximizing stage for said dyeing machine, acquiring color values of said second set of substrates with respect to a maximizing calibration card, and adjusting said multiple ink dispensing rates for said maximizing stage until a color value of said second set of dyed substrates matches said effective maximum colorimetric value for said dyeing machine.

4. The method of claim 3, wherein determining said effective maximum ink dispensing rate for said dyeing machine comprises interpolating multiple maximum ink dispensing rates and multiple maximum color values of multiple substrates dyed at said multiple maximum ink dispensing rates.

5. The method of claim 1, wherein dividing said effective maximum ink dispensing rate into multiple intervals comprises dividing according to a color response of multiple substrates dyed at said multiple ink dispensing rates determined for performing said linearizing stage.

6. A system for calibrating a dispensing rate for a dyeing machine, the system comprising:

a dyeing machine configured to dye multiple substrates via multiple ink channels; and a processor configured to calibrate a dispensing rate for each of said ink channels of said dyeing machine by:

for each of said multiple ink channels:

performing a maximizing stage to determine an effective maximum ink dispensing rate corresponding to an effective maximum colorimetric value for said dyeing machine, performing a linearizing stage, comprising:

determining multiple ink dispensing rates for said linearizing stage by dividing said effective maximum ink dispensing rate into multiple intervals, calculating a linear correspondence between said multiple ink dispensing rates and multiple calculated colorimetric values, obtaining color values of a first set of substrates dyed according to said multiple ink dispensing rates, building a non-linear correspondence between said multiple ink dispensing rates and said acquired color values, and mapping said linear correspondence to said non-linear.

7. The system of claim 6, further comprising an optical detector configured to acquire said color values.

8. The system of claim 6, further comprising a spectrophotometer configured to acquire said color values.

9. The system of claim 6, further comprising a maximizing calibration card for performing said maximizing stage, wherein said maximizing calibration card is provided with an area for placing multiple substrates dyed at multiple maximum ink dispensing rates for each of said ink channels, and multiple areas comprising multiple grayscale features interleaved with multiple areas for placing substrates dyed at variable ink dispensing rates for each of said ink channels.

10. The system of claim 6, further comprising a maximizing dispensing calibration card for performing said maximizing stage, wherein said maximizing dispensing calibration card is provided with an area for placing multiple substrates dyed at multiple maximal ink dispensing rates for each of said ink channels, and wherein said background of said maximizing calibration card presents multiple opposing grayscale gradients.

11. The system of claim 6, further comprising a linearizing calibration card for performing said linearizing stage, wherein said linearizing calibration card is provided with an area for placing multiple substrates dyed at said multiple ink dispensing rates for performing said linearizing stage, and multiple areas comprising multiple grayscale features interleaved with multiple areas for placing substrates dyed at said multiple ink dispensing rates for performing said linearizing stage.

12. The system of claim 6, further comprising a linearizing dispensing calibration card for performing said linearizing stage, wherein said linearizing dispensing calibration card is provided with an area for placing multiple substrates dyed at multiple ink dispensing rates for performing said linearizing stage for each of said ink channels, and wherein said background of said linearizing calibration card presents multiple opposing grayscale gradients.

13. A computer program product comprising a non-transitory computer-readable storage medium having program code embodied thereon, the program code executable by at least one hardware processor for calibrating a dispensing rate for a dyeing machine by:

for each of multiple ink channels of said dyeing machine:

performing a maximizing stage to determine an effective maximum ink dispensing rate corresponding to an effective maximum colorimetric value for said dyeing machine; and performing a linearizing stage, comprising:

determining multiple ink dispensing rates for said linearizing stage by dividing said effective maximum ink dispensing rate into multiple intervals, calculating from said effective maximum colorimetric value, a linear correspondence between said multiple ink dispensing rates and multiple calculated colorimetric values, obtaining color values of a first set of substrates dyed according to said multiple ink dispensing rates, interpolating a non-linear correspondence between said multiple ink dispensing rates and said acquired color values, and mapping said linear correspondence to said non-linear correspondence.

14. The computer program product of claim 13, wherein said program code is further executable to determine said effective maximum ink dispensing rate for said dyeing machine by interpolating multiple maximum ink dispensing rates and multiple maximum color values of multiple substrates dyed at said multiple maximum ink dispensing rates.

15. The computer program product of claim 13, wherein said program code is further executable to divide said effective maximum ink dispensing rate into multiple intervals by dividing according to a color response of multiple substrates dyed at said multiple ink dispensing rates determined for performing said linearizing stage.

* * * * *